(12) United States Patent
Learned et al.

(10) Patent No.: US 7,593,473 B2
(45) Date of Patent: Sep. 22, 2009

(54) TREE STRUCTURED MULTICARRIER MULTIPLE ACCESS SYSTEMS

(75) Inventors: Rachel E Learned, Waltham, MA (US); Brandon Pierce Hombs, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 660 days.

(21) Appl. No.: 11/291,883

(22) Filed: Dec. 1, 2005

(65) Prior Publication Data
US 2006/0120471 A1    Jun. 8, 2006

Related U.S. Application Data

(60) Provisional application No. 60/632,098, filed on Dec. 1, 2004.

(51) Int. Cl.
*H04K 1/10*    (2006.01)
*H04L 27/28*    (2006.01)

(52) U.S. Cl. .......................... 375/260; 455/59; 455/60; 370/464; 370/480; 370/481; 370/482; 370/484

(58) Field of Classification Search .................. None
See application file for complete search history.

(56) References Cited

U.S. PATENT DOCUMENTS 7,327,668 B2 *    2/2008    Mottier ....................... 370/203

| 7,430,257 | B1 * | 9/2008 | Shattil | 375/347 |
|---|---|---|---|---|
| 7,486,726 | B2 * | 2/2009 | Alexander et al. | 375/232 |
| 2003/0053527 | A1 * | 3/2003 | Brunel | 375/148 |
| 2003/0072291 | A1 * | 4/2003 | Brunel | 370/342 |
| 2003/0198303 | A1 * | 10/2003 | Taylor et al. | 375/340 |
| 2009/0110033 | A1 * | 4/2009 | Shattil | 375/141 |

OTHER PUBLICATIONS

Learned et al., "Low Complexity Optimal Joint Detection for Oversaturated Multiple Access Communications," Jan. 1997, IEEE Transaction On Signal Processing, vol. 45, No. 1, pp. 113-123.*
Learned, Rachel E., et al., "Low Complexity Optimal Multiple Access Joint Detection for Linearly Dependent User Sets", pp. 1-4, LIDS-P-2337, Massachusetts Institute of Technology, MA.
Learned, Rachel E., et al., "Low Complexity Optimal Joint Detection for Oversaturated Multiple Access Communications", IEEE Transactions On Signal Processing, Jan. 1997, pp. 113-123, vol. 45, No. 1.

(Continued)

*Primary Examiner*—Shuwang Liu
*Assistant Examiner*—Gina McKie
(74) *Attorney, Agent, or Firm*—Vern Maine & Associates

(57) ABSTRACT

A Tree-structured multicarrier multiple access communication system in a multiple access environment having a number of interfering signals. In one embodiment an environment estimator estimates and tracks the number of interfering signals of the environment. A code selector determines an optimal spreading code represented by the environment, and identifies an actual spreading code that is closest to the optimal spreading code. A signal transmitter can then be used to transmit a multicarrier multiple access signals in accordance with the actual spreading code identified. On the receiver side, a multiuser detector (MUD) module performs tree structured multiuser detection signal processing, and produces a bit stream for each interfering signal.

16 Claims, 12 Drawing Sheets

OTHER PUBLICATIONS

Learned, Rachel E., et al., "Low Complexity Signal Processing and Optimal Joint Detection for Over-Saturated Multiple Access Communications", A Report of the Laboratory of Information and Decision Systems: LIDS-P-2315, pp. 1-19.

Kaemarungsi, Kamol, et al., "On the Use of Adaptive OFDM to Preserve Energy in Ad Hoc Wireless Networks", pp. 1-12.

Wang, Zhengdao, et al., "Wireless Multicarrier Communications where Fourier Meets Shannon", pp. 1-21, Dept. of ECE, University of Minnesota, MN.

Cioffi, John M., "A Multicarrier Primer", pp. 1-18, Amati Communications Corporation and Stanford University.

Moose, Paul H., "A Technique for Orthogonal Frequency Division Multiplexing Frequency Offset Correction", IEEE Transactions On Communications, Oct. 1994, pp. 2908-2914, vol. 42, No. 10.

Bingham John, A. C., "Multicarrier Modulation for Data Transmission: An Idea Whose Time Has Come", IEEE Communications Magazine, May 1990, pp. 5-14.

"OFDMA Overview", [online], [retrieved on Mar. 31, 2006], Retrieved from Internet <URL: http://www.runcom.com/SiteFiles/1/2/13.asp>, pp. 1-2, Runcom Technologies Ltd.

Koffman, Israel, et al., "Broadband Wireless Access Solutions Based on OFDM Access in IEEE 802.16", IEEE Communications Magazine, Apr. 2002, pp. 96-103.

Cai, Xiaodong, et al., "Group-Orthogonal Multicarrier CDMA", IEEE Transactions On Communications, Jan. 2004, pp. 90-99, vol. 52, No. 1.

\* cited by examiner

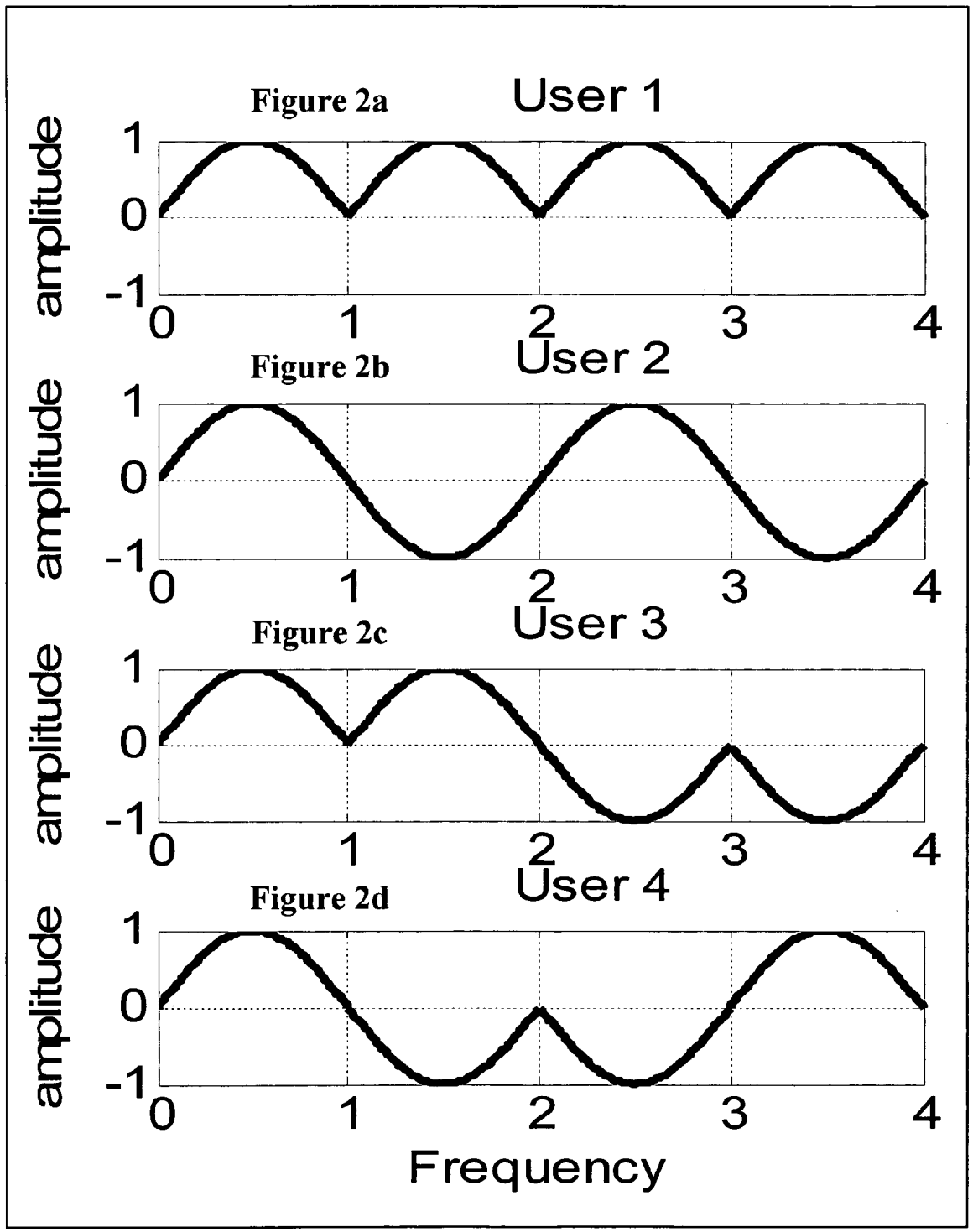

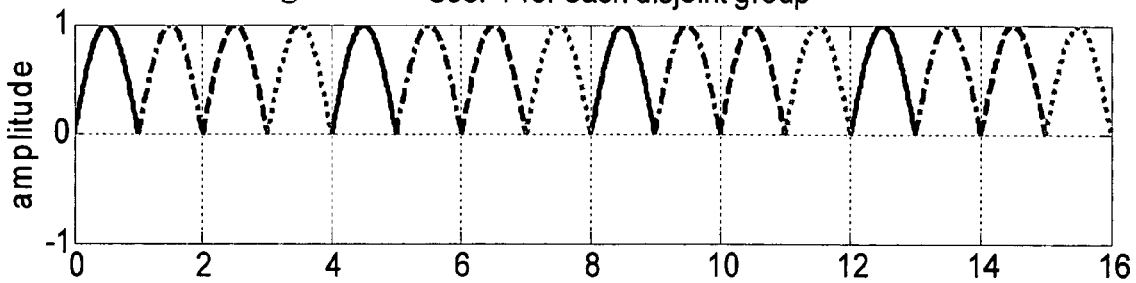
Figure 6a  User 1 for each disjoint group
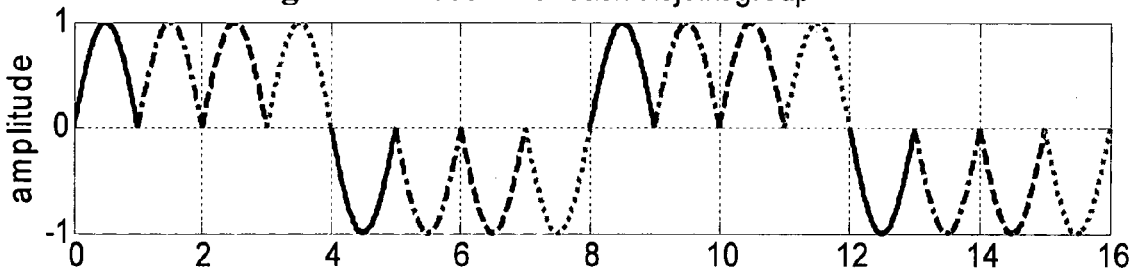
Figure 6b  User 2 for each disjoint group
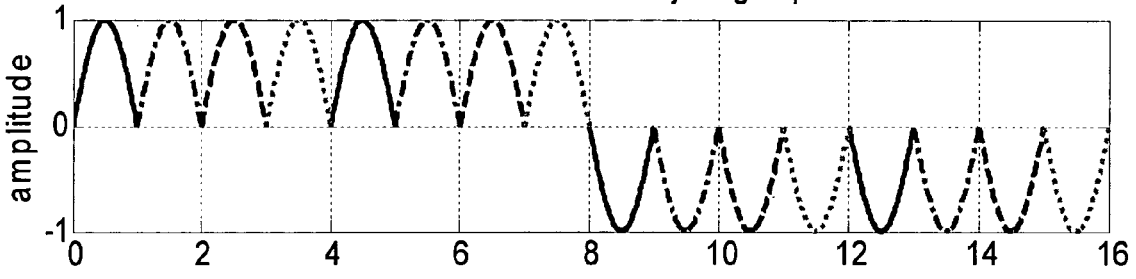
Figure 6c  User 3 for each disjoint group
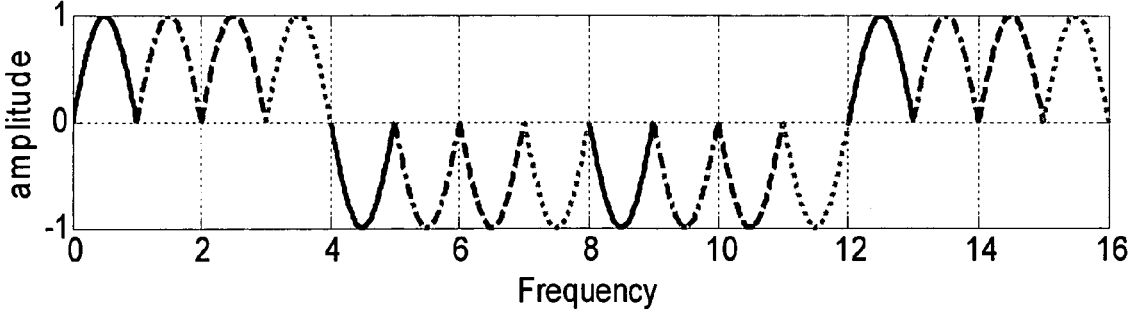
Figure 6d  User 4 for each disjoint group

TREE STRUCTURED MULTICARRIER MULTIPLE ACCESS SYSTEMS

RELATED APPLICATIONS

This application claims the benefit of U.S. Provisional Application No. 60/632,098, filed Dec. 1, 2004 which is herein incorporated in its entirety by reference.

FIELD OF THE INVENTION

The invention relates to communication systems, and more particularly, to multicarrier systems with multiuser detection.

BACKGROUND OF THE INVENTION

There has been considerable attention on using multicarrier communication techniques to transmit information over wireless channels. For example, orthogonal frequency division multiplexing (OFDM) has been picked as the basis for the 802.11a and 802.11g standards for wireless local area networks.

Multicarrier systems have several features which make them attractive to the wireless medium. For one thing, the equalization task in a well designed system can be simply implemented as a multiplication on each subcarrier rather than via a RAKE-receiver scheme or a convolution. Moreover, estimating the parameters required for receiver processing is reliably done with a simple algorithm since the signals are disjoint and narrow band, each experiencing a simple flat fading.

The multicarrier system can also be set up so that some or all the users have orthogonal waveforms. Multicarrier systems can conceptually maximize the information capacity of the network by careful allocation of power and bit rate among its subcarriers.

However, the multicarrier systems present significant challenges to the system designer. Several schemes have been proposed to meet these challenges, many of which use pilots or training sequences.

Conventional methods of wireless "multiple access" communication have difficulty with interference when many devices are assigned to a single wireless network, as well as when another network of wireless devices exists nearby at the same frequency. When there is interference, such conventional systems may begin to output a higher bit error rate (BER) and, may possibly fail to operate reliably, thus dropping devices and connections in a seemingly random fashion.

Tree structured interference is known to allow for an overpacking of the available channel resources, while allowing for an optimal multiuser joint detector to be implemented in real-time. In contrast, optimal joint detection for interfering (non-orthogonal) users in a multiple access communication system generally has a computational complexity that increases exponentially with the number of users. Thus, practical limitations necessitate the integration of tree structured techniques into multiple access systems such as wireless local area networks, mobile and cellular terrestrial systems, and satellite-based systems.

There is a need, therefore, for techniques that alleviate degraded performance and throughput in a wireless communication system due to interference from other transmitters in the system assigned to either the same network or to a different nearby network.

SUMMARY OF THE INVENTION

One embodiment of the present invention provides a multicarrier system conjoined with tree structured multiple access schemes to take advantage of the benefits provided by both multicarrier systems and multiuser detection (MUD) schemes. One embodiment is a Tree Structured orthogonal frequency division multiple access (TS-OFDMA) and another embodiment is a Tree Structured Multicarrier Code Division Multiple Access (TS-MC-CDMA).

Another embodiment of the invention is a tree-structured multicarrier interference multiple access (MC-IMA) transceiver for use in a multiple access environment having a number of interfering signals, comprising an environment estimator module configured to estimate and track the number of interfering signals of the environment. There is a multicarrier signature signal selector configured to determine a multicarrier signature signal as a function of the environment, and to identify an actual multicarrier signature signal that is closest to the multicarrier signature signal. A signal transmitter is configured to transmit a multicarrier multiple-access signal in accordance with the actual multicarrier signature signal identified by the multicarrier signature signal selector. A multiuser detector (MUD) module is configured to perform tree structured multiuser detection signal processing, and to produce a bit stream for each interfering received signal.

Other aspects of the invention includes wherein the multicarrier signature signal selector is configured to determine an optimal multicarrier signature signal. The multicarrier signature signal can also be any multicarrier signature signal that abides by the tree-structure.

Another aspect includes the transceiver further comprising a stream of interest selector configured to select one or more bit streams of interest.

A feature of the invention includes wherein the multicarrier signature signal selector is further configured to determine received powers and rates of each active user in the environment, and to determine a channel degradation value for a communication link between the transceiver and a destination receiver.

Further aspects of the transceiver include wherein the multicarrier signature signal selector is further configured to build a set of parent multicarrier signature signals based on a known set of basis subcarriers used in the base set of multicarrier signature signals, and to build a set of grandparent multicarrier signature signals based on either the set of parent multicarrier signature signals or the basis set of subcarriers from which those signals were comprised, and to continue creating ancestor nodes in the same manner until there are no more nodes to combine in this manner. An optional feature includes deleting any of the nodes and corresponding signature signals from the set of tree-structured multicarrier signature signals.

The code selector can be further configured to arbitrarily making sibling groups of one or more base multicarrier signature signals per group, not allowing any one base multicarrier signature signal to have a non-zero or non-negligible cross correlation with any signal in more than one group, and creating a new multicarrier signature signal by linearly combining all the base spreading codes within a sibling group or by constructing a new multicarrier signature signal from the basis set of subcarriers present in the aggregate of all the signals within a sibling group.

The transceiver wherein the code selector is further configured to arbitrarily making sibling groups of one or more parent multicarrier signature signals per group, not allowing any one multicarrier signature signal to have a non-zero or non-negligible cross correlation with multicarrier signature signals in more than one group, and linearly combining all the multicarrier signature signals or creating a new multicarrier signature signal from the set of subcarriers used within a sibling group.

A method embodiment includes performing tree-structured multicarrier interference multiple access (MC-IMA) communication in a multiple access environment having a number of interfering signals, comprising estimating and tracking the number of interfering signals of the environment, determining a multicarrier signature signal represented by the environment, and identifying an actual multicarrier signature signal that is closest to the multicarrier signature signal, transmitting a multicarrier multiple access signal in accordance with the actual multicarrier signature signal, and performing tree structured multiuser detection signal processing, and producing a bit stream for each interfering signal.

The multicarrier signature signal can be a multicarrier signature signal that abides by the tree-structure an optimal or an optimal multicarrier signature signal. Determining the optimal multicarrier signature signal may further include determining received powers and rates of each active user in the environment, and determining a channel degradation value for a communication link between the transceiver and a destination receiver.

The method may include determining a multicarrier signature signal comprises building a set of parent multicarrier signature signals based on a known set of base multicarrier signature signals or the set of subcarriers used by the base set of users, building a set of grandparent multicarrier signature signals based on the set of parent multicarrier signature signals or the set of subcarriers used by the base set of users, and continuing this progression upward by doing the same for a set of great-grandparent multicarrier signature signals and so on, until all nodes have been linked. This may further include deleting any of the nodes and corresponding signature signals from the set of tree-structured multicarrier signature signals.

The method may further include building a set of parent multicarrier signature signals comprising arbitrarily making sibling groups of one or more base multicarrier signature signals per group or set of subcarriers used by that group, not allowing any one base multicarrier signature signals to have a non-zero cross correlation with signals in more than one group, and creating a new multicarrier signature signal by linearly combining all the base spreading codes within a sibling group or constructing a new multicarrier signature signal from the basis set of subcarriers present in the aggregate of all the signals within a sibling group.

The method may further include building a set of grandparent multicarrier signature signals comprising arbitrarily making sibling groups of one or more parent multicarrier signature signals or set of subcarriers used by a group of parents, not allowing any one parent multicarrier signature signals to have a non-zero non-negligible cross correlation with any multicarrier signature signal in more than one group, and creating a new multicarrier signature signal by linearly combining all the base spreading codes within a sibling group or constructing a new multicarrier signature signal from the basis set of subcarriers present in the aggregate of all the signals within a sibling group.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 2a-2d shows four users in an MC-CDMA system, wherein each user sends the carriers with the relationship detailed herein, and the subcarriers are all modulated by the same information symbol but different elements of the spreading code.

FIGS. 6a-d shows the 16 signals for the base nodes of the tree structure in a tree-packed MC-CDMA system, configured in accordance with one embodiment of the invention.

DETAILED DESCRIPTION OF THE INVENTION

Figure 1A:
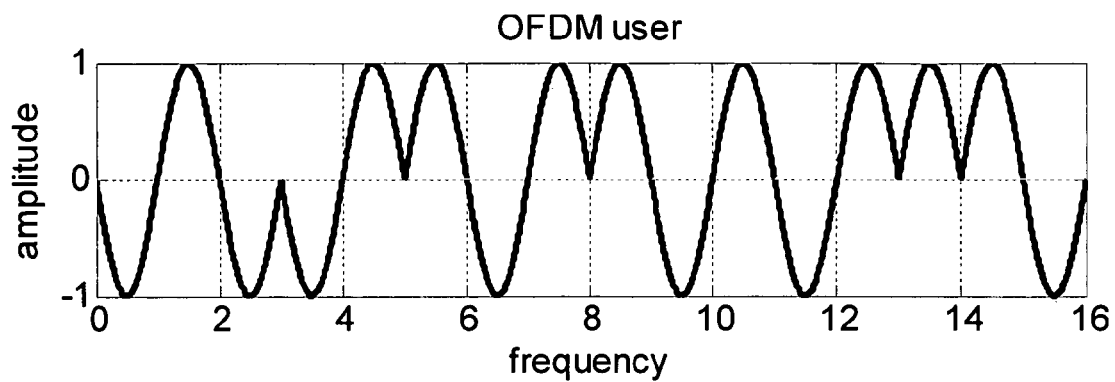
FIG. 1a is a prior art single user multicarrier system wherein an OFDM user's spectrum is transmitting on 16 carriers.

Multi-carrier code division multiple access (MC-CDMA) systems can be used, for example, for mobile cellular communications and other wireless networks. MC-CDMA can generally be described as a combination of orthogonal frequency division multiplexing (OFDM) and CDMA. Stated in another manner, OFDM is a subset of MC-CDMA. CDMA was designed for the purpose of allowing multiple users to occupy the same frequency channel simultaneously, and assigns individual users a unique spreading code that is orthogonal to all other user's spreading codes. When spread, individual users appear as noise to all other users. OFDM, which was designed for the purpose of reliably transmitting data over time-dispersive or frequency selective environments without the use of complex time-domain channel equalizers, takes advantage of the properties of the Fast-Fourier Transform (FFT) to provide orthogonal sub-channels. In particular, OFDM takes a large high-rate bandwidth and divides it into overlapping orthogonal lower-rate sub-channels, and offers the advantages of ease of channel equalization and the ability to allow variable data rates per sub-channel. Since the transmitted information is broken into several narrowband channels, it ensures flat fading over each sub-channel, allowing for equalization with a complex divide at the receiver. Using knowledge of the channel and the type of service being requested, the selection of the waveform at each sub-channel can be dynamically adapted to maximize the information carrying capacity of the sub-channel.

Demand for channel use can be responded to, for example, even when it requires assigning more code signatures or channels than can co-exist orthogonally. There are numerous ways of re-assigning the bandwidth. For example, overlapping frequency division multiple access (FDMA) bands or time division multiple access (TDMA) slots can be used to create a sort of "domino" packing where adjacent users interfere heavily. In a direct sequence spread spectrum (DSSS) system users may take on any Walsh code, regardless of whether or not it has already been assigned. Bandwidth is directly re-assigned such that users interfere with each other in the same manner a spoof signal interferes (e.g., "right on top" of each other). Users are assigned waveforms that interfere in a tree-structured way, as will be explained herein.

The loading of a wireless communication systems is generally described as the number of users per the number of dimensions in the transmit space. Overloading is caused by the proliferation of networks without expanding the set of resources. As previously stated, performance impacts due to interfering signals during an overloaded condition include a higher BER and an unreliable communication link. Most traditional communication systems treat multiuser interference as noise, which causes severe degradation of all individual users' receiver performance. Instead of treating interference as noise, an embodiment of the present invention uses the specifications of the interfering signals and cancels them.

In accordance with an embodiment of the present invention, each MC-CDMA radio (also referred to as a transceiver) of the wireless communication system knows the specifications of the interfering signals. For instance, each radio knows the dictionary of signature waveforms and/or "spreading" codes, possible operating frequencies, baud rates, data/voice compression rates, dictionary of regularly placed or seemingly randomly placed known bits that act as training sequences or data-punctured pilots, error correction codes, and possibly encryption keys.

Each radio's receiver is always performing parameter estimation/tracking, so it always knows how many users are active, the code or signature waveform of each active user, the received power, carrier phase, channel (multipath), Doppler, timing offset, and other pertinent system parameters. Each radio is configured to perform multiuser detection in addition to the parameter estimation module. In some embodiments, the MUD module might be part of the parameter estimation module. In any case, degraded performance and throughput in the wireless communication system due to interference from other transmitters in the system assigned to either the same network or to a different nearby network is reduced.

The present invention can be used in various implementations. For example, a controller based system employs a controller that assigns each user with a signature waveform that conforms to the tree structure. An example would be a cellular system that requires a handshake before a user becomes active in the system. This handshake would typically assign the user its set of subcarriers and code. Each user can be communicating with any subset of other users as long as the tree structure is maintained.

Referring to FIG. 1a, a basic single user multicarrier system is shown, wherein an OFDM user's spectrum is transmitting on 16 carriers. Each subcarrier has a different information symbol modulated on it (the actual sequence is [−1 1 −1 −1 ... 1 1 −1]). The subcarrier's spectrum is illustrated as half sine waves for simplicity, and in some embodiments they would be sinc functions. A user is sending information on 16 carriers and is modulating each subcarrier with a separate data symbol. The distance between each subcarrier in the frequency domain is selected so that each carrier appears to have gone through a flat fading channel and thus can be easily estimated and equalized by multiplying by the inverse of the gain induced by the channel.

Figure 1B:
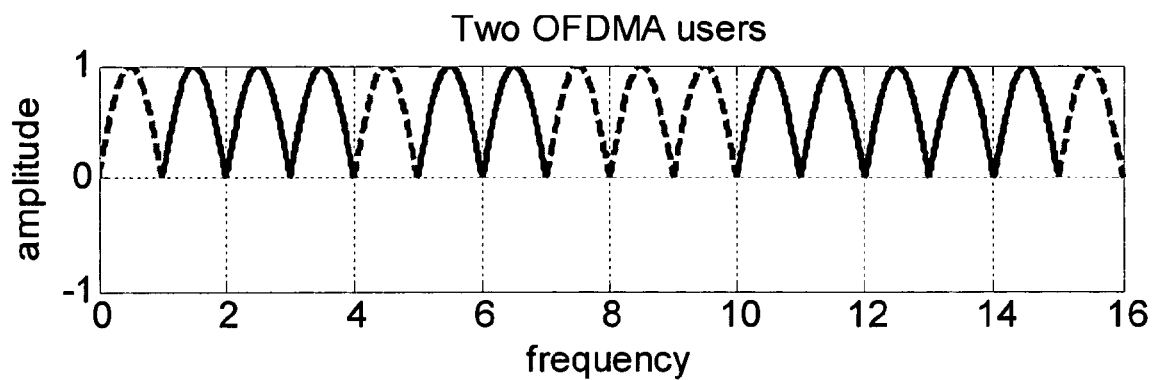
FIG. 1b shows a prior art OFDMA system shown with two users, wherein each user is assigned a subset of the subcarriers to send its information.

Referring to FIG. 1b, to make a multicarrier transmitter cooperate in a multiple-access environment a special structure is generally assigned to each user in the system. This can be done in several ways and a few examples are illustrated to explain the conceptual framework. First, each user can be assigned a subset of subcarriers from a large group of subcarriers.

The example depicted in FIG. 1b shows two users sharing the spectrum using separate subcarriers. This is referred to as orthogonal frequency division multiple access (OFDMA). The Users are designated as follows: ——r User; ——b User.

In this scenario it is usually assumed that each user is assigned a subcarrier and no other user can use that subcarrier. The present invention is not restricted to the disjoint frequency case, instead, it allows users to share subcarriers to provide for a larger number of users in the system. Current systems using OFDMA include 802.16e, sometimes known as Mobile WiMAX.

Another option for multiple access using multicarrier systems is multicarrier CDMA (MC-CDMA). This is the approach of assigning spreading codes to the subcarriers used by a single user. For example, a user may send a single bit over many subcarriers with the polarity of each subcarrier being a function of the bit and the chip (element of the spreading code) that is assigned to that subcarrier. FIGS. 2a-2d shows this system with four users sharing four subcarriers. The first subplot shows the carrier orientation of User 1. User 1 adjusts the polarity of every carrier based on the polarity of its information bit. Therefore, its spectrum is shown with an ambiguity in the polarity due to the modulation of the symbol. The same technique is used for the other users but they have different carrier orientations (specified by the spreading code).

The MC-CDMA approach has many of the same advantages of direct-sequence CDMA (DS-CDMA) for narrow-band interference suppression and a graceful degradation of system performance (bit error rate) as the number of users increases. See, for example, R. V. Nee and R. Prasad, "*OFDM for Wireless Multimedia Communications*"; Boston, Mass., Artech House, 2000. Users are separated at the receiver by the assigned spreading codes. In typical systems, the number of users is limited by the length of the spreading code because users are designed to be orthogonal (or nearly orthogonal). This type of system generally does not permit overloading, and if more users are allowed to transmit in the system, then orthogonality cannot be maintained and complex receiver structures must be employed.

Method For Overloading an OFDMA or MC-CDMA

When the number of users in any of the proposed multiple-access multicarrier systems increases past the number of degrees of freedom in the system, it becomes difficult or impossible to guarantee that the users' signals are separable by conventional means (orthogonal). In this case, a multiuser detector can be employed to significantly improve the system performance. Multiuser detectors try to make decisions about what every user in the system is sending instead of treating one user as the desired user and the other users as noise. One of the current limiting factors in the application of MUD to wireless communications is the complexity involved in solving for the joint estimate of all users' information, as well as the current lack of good parameter estimation algorithms to produce the required knowledge of the received signal parameters to the MUD. To mitigate the complexity issue of MUD, signal packing schemes have been proposed which can decrease the amount of processing that must be done to find the joint decision.

By inducing a tree structure on the correlations of the users' signals, the complexity of the MUD can be greatly diminished, as described by R. E. Learned in a PhD Thesis, MIT, January 1997, "*Low Complexity Optimal Joint Detection for Over-Saturated Multiple Access Communications.*" See also R. E. Learned, A. S. Willsky, and D. M. Boroson, "*Low Complexity Optimal Joint Detection for Over-Saturated Multiple Access Communications,*" IEEE Trans. On Signal Processing, Vol. 45, No. 1, January 1997. Both of these references are incorporated by reference in their entirety. A tree structure guarantees that users will have correlation with only a subset of other users. If a user has correlation with another user then these users must be related through a path in the tree. Users that do not lie on the same path through the tree are orthogonal. This packing greatly reduces the computational complexity of the MUD by exploiting the relationship between the signals.

As described herein, one embodiment of the present invention is a method for combining multicarrier systems with tree structured signal packing. Using this structure, multiple-access systems can benefit from the frequency diversity and simple signal parameter estimation provided by multicarrier systems in addition to the ability to pack more users in a given bandwidth and detect and decode all interfering users symbol streams as provided by MUD. The advantages of such a system are evident and a case for the combination of MUD and multicarrier systems was made by X. Cai, S. Zhou and G. B. Giannakis in "*Group-orthogonal Multicarrier CDMA*", IEEE Trans. Commun., vol. 52, pp 90-99, January 2004. However, this reference does not provide a general method for designing multicarrier systems to simplify the MUD and it further assumes that there are only as many users as available dimensions. The present invention provides for more users than dimensions.

One embodiment of a signal packing scheme on the present invention enables the system to maintain more users than dimensions while making the MUD in the receiver simple enough to implement in real time. Moreover, the narrow band flat fading quality of multicarrier signaling allows for a simple multiuser parameter estimation procedure.

In addition to having benefits for RF multicarrier systems, tree structuring could also be useful in an optical system that uses wavelength division multiple access (WDMA), which is identical in construction to RF multicarrier MA systems. In this case optical detectors and minor modifications to the MUD are used to facilitate the physical limitations in detecting optical signals.

Tree Structured Packing to Achieve Overloading

In a well-designed underloaded system, all the users ideally employ mutually orthogonal signaling waveforms (ie. signatures), or at least nearly uncorrelated signatures. Extending this working definition, a fully loaded system accommodates the maximum number of users possible while still satisfying the orthogonality or correlation criterion. A means for overloading a multiple access systems to allow for the reliable separation/detection of more users than available dimensions is known to those in the art.

In general, the overloaded system contains at least some users whose signatures are not orthogonal, or who have sizeable correlations. However, by proper structuring, one may design a system to optimally accommodate this overloaded condition. The user signatures (synchronous or asynchronous in time) in Learned's construction of an overloaded system are constructed to obey a tree-like interference rule. Moreover, the tree-structured signals in Ross and Taylor's construction in the paper J. A. F. Ross and D. P. Taylor, "*Multiuser signaling in the symbol-synchronous AWGN channel*", IEEE Transaction on Information Theory, 41, July, 1995, are in some sense an optimal way to create a tree relationship among the various interfering users. Most importantly, however, is the fact that any set of tree structured signals will likely result in a robust multicarrier interference multiple access system, so an optimal choice of the signature set and tree is only one embodiment of the present invention.

One realization of a process for creating the user signature waveforms to obey a tree-structure of cross-correlation is to proceed in a tree-like fashion, such that 1) the leaf nodes all correspond to mutually orthogonal signatures, and 2) the connecting nodes then correspond to signatures formed from linear combinations of their children or, more generally, have non-zero or non-negligible inner products with signatures corresponding to their children, but have zero (or nearly zero) inner products with the other non-child leaf nodes.

According to Learned's example for creating a set of tree-structured signatures, in general, there are four requirements:

(a) The specification of the tree structure (i.e. the connections among the nodes).
(b) The specification of a set of orthogonal basis functions to assign to the N leaf nodes that terminate the tree.
(c) The specification of weights to use in the linear combinations of lower level nodes that form the upper level leaf nodes.

(d) Optionally, the ability to delete signatures at any node when specifying the system.

Thus, Learned's scheme is limited to the above realization of a process to create a set of signatures that obey tree-structured cross correlations and requires exact mathematical combinations of lower node signatures to create upper node signatures. The present invention encompasses the more general method for which a set of tree structured signatures can be created to include a more adhoc process that does not require exact mathematical combinations of lower node signatures to create upper node signatures, but instead, creates a parent signature to be correlated with it's children signatures. Thus, with respect to the present invention, it is not required for that parent signature to strictly be a linear combination of the child signatures. This more general extension allows for building a tree-set of signatures in the asynchronous case, as well as in the case for which specific detailed knowledge of any transmitter or channel distortions are unavailable, or are not required to correctly model.

The reduced complexity optimal tree-MUD algorithm can be applied as long as cross correlations among any set of received user signatures across a level of the tree are orthogonal (or nearly so) while any set of received user signatures that lie along a connected path of the tree have a non-zero cross correlation. A portion of the invention that addresses building tree-structured sets of OFDMA and MC-CDMA are thus general in the actual procedure that one would utilize.

Tree-Packing Within the Multicarrier Framework

An assumption to the general processing is that every user in the system is equipped with the capability for multicarrier communication over a given bandwidth. The bandwidth is divided into subintervals called subchannels or subcarriers. The number of subcarriers is a function of the total multicarrier symbol length and the amount of bandwidth that is available. A further assumption is that the symbol time on each subcarrier is long enough to guarantee flat fading on each subcarrier. This is determined by the coherence bandwidth or delay spread of the channel. Every user will be assigned a subset (not necessarily a proper subset) of the set of subcarriers. The user can utilize the subcarriers in a number of different ways, depending on the network architecture.

Each user may send one symbol on each subcarrier, the same symbol on every subcarrier, or some trade off in between based on a precoding matrix. Sending the same symbol on every carrier can be understood as a specific simple type of precoding, namely repetition precoding of the symbols for assignment to the subcarrier set. Such a system is generally described by Z. Wang and G. B. Giannakis, "*Wireless Multicarrier Communications Where Fourier Meets Shannon*," I.E.E.E. Signal Processing Magazine, Vol 17, No. 3 (May, 2000), pp. 29-48.

It is well known by those proficient in the art of multicarrier communications that it is advantageous for users to send every information symbol over many carriers to decrease the probability that a symbol is "lost" by being sent over a subcarrier that is severely attenuated due to fading. This can be accomplished in many ways for different types of systems. For example, OFDMA systems will use error control coding across the subcarriers to diversify the information through the channel. In general, however, the amount and type of precoding should be determined based on the amount of frequency diversity that is required and the nature of the communication link.

Adding the desire to pack signals in such a way as to maintain a tree structure at the receiver so that the efficient Tree-MUD can be used, adds another consideration for the choice of preceding. For example, a limited amount of precoding may be desirable for maintaining the tree structure. The trade off between precoding and strict adherence to the tree structure should be done on a case by case basis, depending on the channel, whether it is an uplink or downlink system, and the computational complexity allowed at the receiver. For the remainder, it should be understood that various techniques can be used to attain frequency diversity and the tree-packed multicarrier framework is a general concept since the tree packing can be applied in several different situations.

In an uplink scenario every user's signal will be subjected to a different channel due to the spatial separation that is assumed, so the design considers the worst case coherence bandwidth. In a downlink scenario, the channel that every user's signal goes through is the same from a single receiver's point of view. Different users have a different channel from themselves to the base station but since the base station is transmitting all the users' signals from the same location, they all go through the same channel when arriving at any given receiver. These two different scenarios, the uplink and the downlink, can both benefit from the tree structured multicarrier approach described herein.

Figure 3:
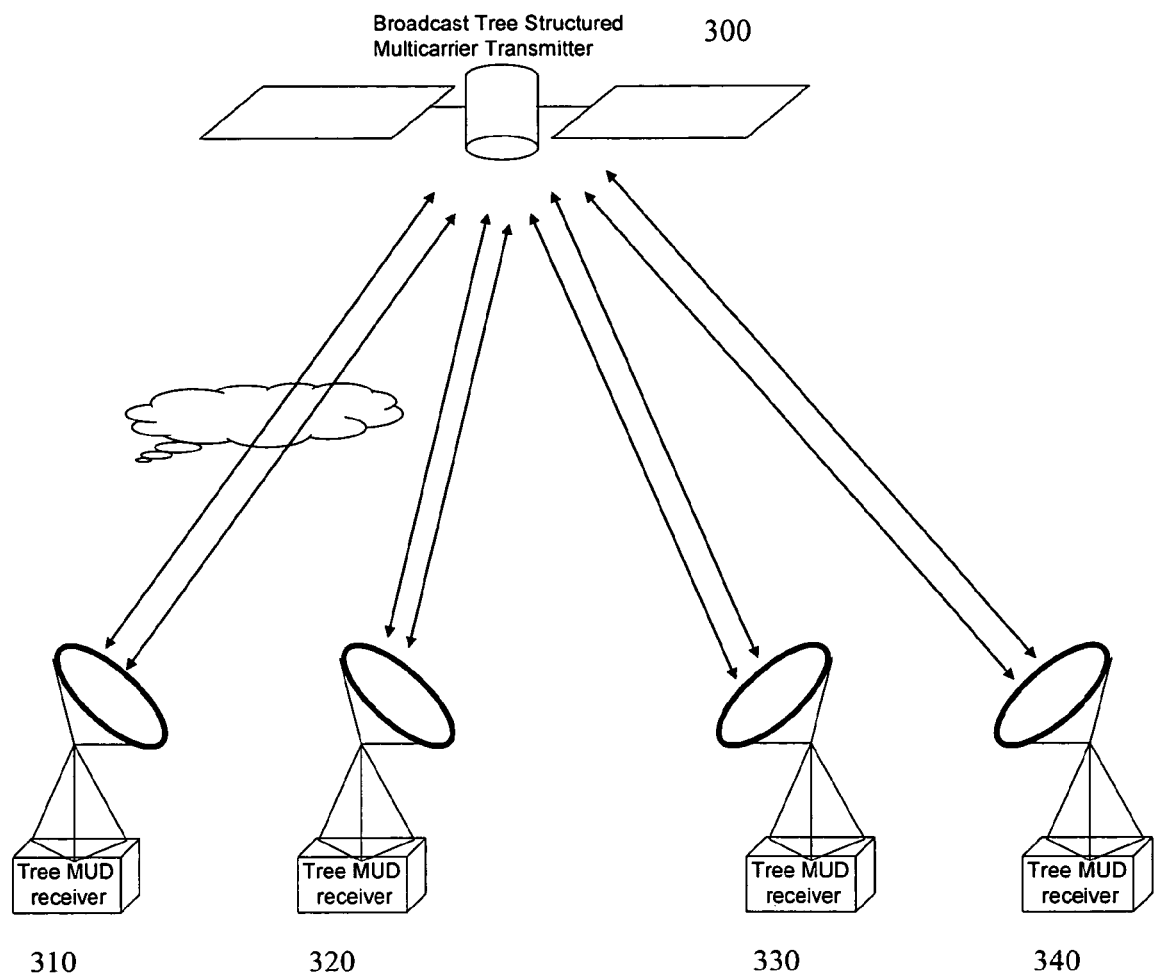
FIG. 3 is a diagrammatic perspective of a broadcast channel embodiment wherein the satellite can control each of the users' signature waveforms to adhere to the tree structure and provide the necessary information to each terminal, and wherein each terminal can then perform the tree-MUD receiver algorithm to extract the signal associated with its branch of the tree.

Referring to FIG. 3 a diagrammatic perspective of a broadcast channel embodiment is depicted. The broadcast tree structured multicarrier transmitter satellite 300 communicates in a bi-directional fashion with a number of tree MUD receivers 310, 320, 330, and 340. The satellite 300 can control each of the users' signature waveforms to adhere to the tree structure and provide the necessary information to each terminal, and wherein each terminal can then perform MUD on its branch of the tree. In a further embodiment, the satellite can also perform the tree-MUD to extract the signals from all the transmitting terminals, if they have been assigned a tree-OFDMA set of interfering signals.

There are several ways in which the tree structure can be applied to a multicarrier system. The main modes of operation generally depend on the network assumptions. For example, in an overloaded downlink scenario a method of imposing the tree structure might be using MC-CDMA. In this case a subcarrier assignment can be utilized as described in the art. The base nodes of the tree structure are formed by selecting groups of subcarriers and assigning the same number of users as subcarriers to each group. Then orthogonal spreading codes can be used to separate the base users in the same group. The number of base nodes will be equal to the total number of subcarriers. Note that the base set of signature signals constructed this way comprises a typical set of orthogonal MC-CDMA users.

System Architecture

Figure 4:
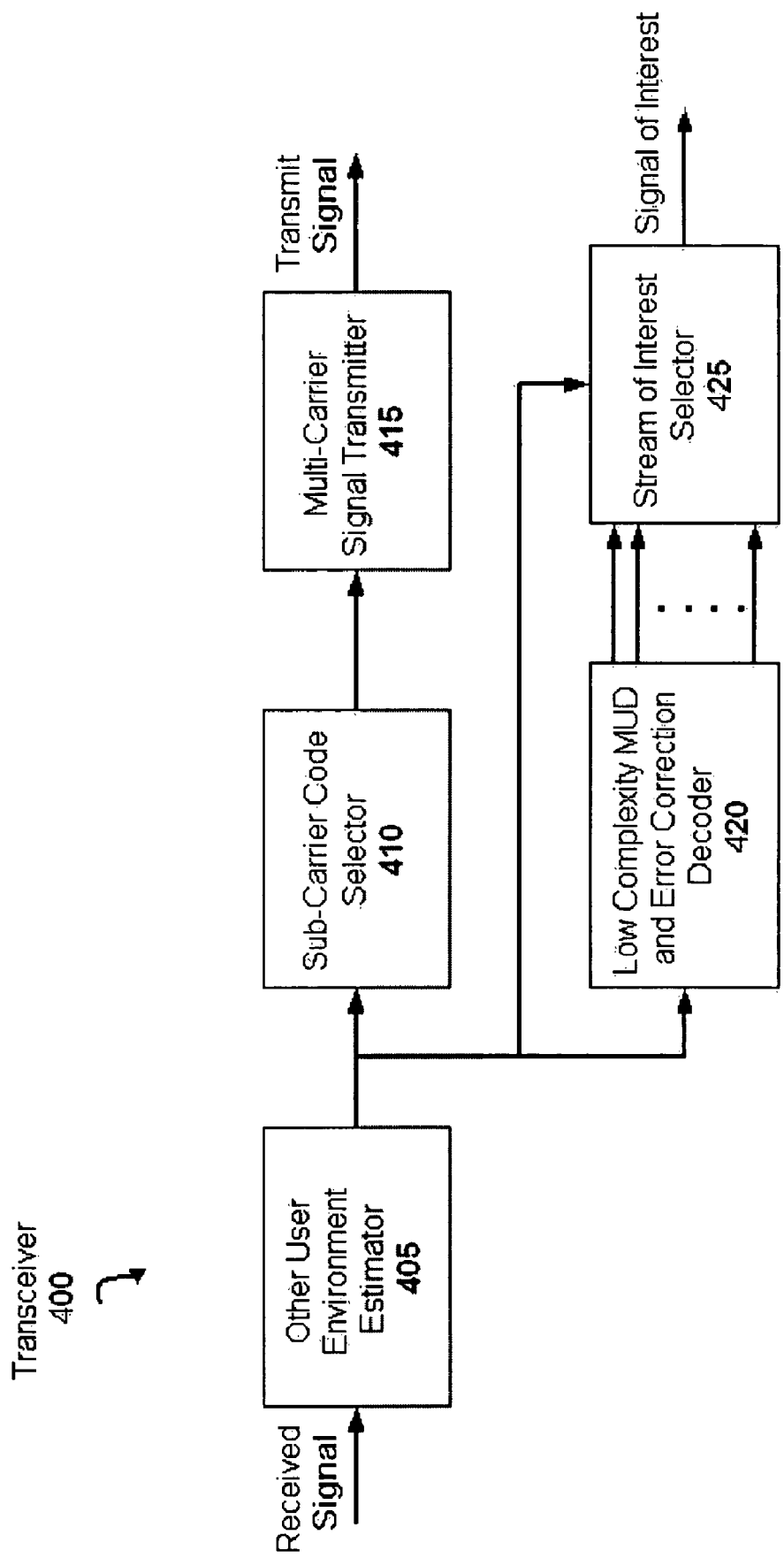
FIG. 4 illustrates tree-structured MC-CDMA transceiver configured in accordance with one embodiment of the present invention.

FIG. 4 is a block diagram of a tree-structured multicarrier transceiver configured in accordance with one embodiment of the present invention. For purposes of discussion, assume that a wireless communication network includes a number of such transceivers and a number of users at any give time and operable in several systems such as MC-CDMA and OFDMA.

As can be seen, the transceiver 400 includes any other user environment estimator module 405, a sub-carrier code selector 410, a multicarrier signal transmitter 415, a low complexity multiuser detector (MUD) that takes advantage of the tree-structured cross correlations and error correction decoder module 420, and a stream of interest selector 425. The received signal is a composite of many interfering signals, some of which are from the same wireless communication system in which transceiver 400 exists, and other of the interfering signals may be from neighboring communication systems.

On the receiver side, the received signal is received by the transceiver 400 and processed through the receiver components, which include the low complexity "tree" MUD and error correction decoder module 420 and the stream of interest selector 425. The signal of interest is output, and can then be provided to its intended destination. On the transmitter side, information relevant to the other user environment is assessed by the estimator module 405, and provided to the transmitter components, which include the sub-carrier code selector 410 and the multicarrier signal transmitter 415. A multicarrier transmit signal that is structured based on the other user environment information is then wirelessly transmitted by the transmitter.

The environment estimator module 405 is configured for estimating/tracking the number of interfering signals, and can be implemented with conventional technology. However, variations will be apparent in light of this disclosure. For example, the estimator module 405 can be configured as described in the commonly assigned U.S. patent application Ser. No. 10/228,787, titled, "Parameter Estimator for a Multiuser Detection Receiver", which is herein incorporated by reference in its entirety. The MUD-required set of parameters associated with each interfering signal is part of the MUD receiver processing provided by module 420 of the transceiver 400.

The sub-carrier code selector 410 can be configured to implement any one of numerous optimization techniques for facilitating the code selection process. In one particular embodiment, the environment information output by the estimator module 405 is provided to the code selector 410. The code selector 410 then determines an optimal sub-carrier code represented by the environment, and searches a look-up table to identify an actual code that is closest to the optimal code detected by the selector 410. How the code selector 410 determines an optimal sub-carrier code represented by the environment is discussed in more detail herein.

The code selector 410 can be implemented, for example, as a set of instructions executing on a digital signal processor or other suitable processing environment that can be configured to carry out the code selection functionality. Note that other modules of the transceiver 400, such as the estimator module 405, transmitter 415, MUD and decoder module 420, and the stream of interest selector 425, can be implemented in whole or part in the same processing environment. Alternatively, each module can be implemented in its own dedicated processing environment. Numerous configurations are possible here, and the present invention is not intended to be limited to any one such embodiment.

The multicarrier signal transmitter 415 can be implemented with conventional technology, and transmits a multicarrier signal in accordance with the multicarrier code selected by the code selector 410. Note that the transceiver 400 may further include other circuitry or components not shown in FIG. 4, such as an analog front end that converts the coded signal to its analog equivalent, amplifies that signal, and then transmits via an antenna. Various filtering is possible as is known in the art to condition signals.

On the receiver side, the low complexity MUD and error correction decoder module 420 receives the composite signal (including a target signal and one or more interfering signal). Note that tree structuring of the interference (as provided by the transmitters at other nodes in the network) will allow for low complexity implementations of very high quality parameter estimation and MUD algorithms. In one particular embodiment, the exponential complexity in the number of ancestors in the tree is no more that 3 or 4. This processing results in a very low complexity on a par with minimum mean squared error (MMSE) MUD modules, for example. Note, however, that low or otherwise reduced complexity MUD algorithms are not required, and other embodiments of the present invention may employ full-complexity algorithms (e.g., based on maximum likelihood principle).

In one particular embodiment, the MUD portion of module 420 is configured with a tree joint detection algorithm that is described in "*Low Complexity Signal Processing and Optimal Joint Detection for Over-Saturated Multiple Access Communications*", R. E. Learned, A. S. Willsky, and D. M. Boroson. Other tree joint MUD algorithms can be used here as well, as will be apparent in light of this disclosure. In any case, the MUD and error correction decoder module 420 is configured to produce a bit stream for each interfering signal included in the received composite signal. The stream of interest selector 425 is configured to select the stream/signal of interest, and can be implemented with conventional technology.

Prior to discussing the tree joint detection algorithm, note that time-bandwidth restrictions on any communication system limit the dimension, N, of the space of possible user waveforms. Adopting the commonly-used vector space framework, the N-dimensional signal space can be identified with $IR^N$ and the multiuser joint detection problem can be stated as follows: for a given set of user waveforms represented in signal space by the set of signal vectors, $\{s_k\}_1^K$, $s_k \in IR^N$, the general uncoded detection problem is to compute an estimate of weights, b, from an observation $r \in \mathfrak{R}^N$:

$$r = \sum_{k=1}^{K} b_k s_k + \sigma n = Sb + \sigma n. \quad \text{(Equation 1)}$$

Here, K is the number of users, and $b \in \{[b_1 \ldots b_K]^T | b_i \in P_i\}$ where $P_i$ is some finite set of real amplitudes and $b_i$ is and independent and identically distributed sequence. For Pi having M elements, this is M-ary PAM. $S = [s_1, \ldots, s_K]$ is an N×K matrix whose columns are user signal vectors as seen at the receiver, and n is a real Gaussian vector of mean zero and identity covariance, and $\sigma$ is the noise standard deviation.

Tree Cross-Correlation Structure

Figure 5A:
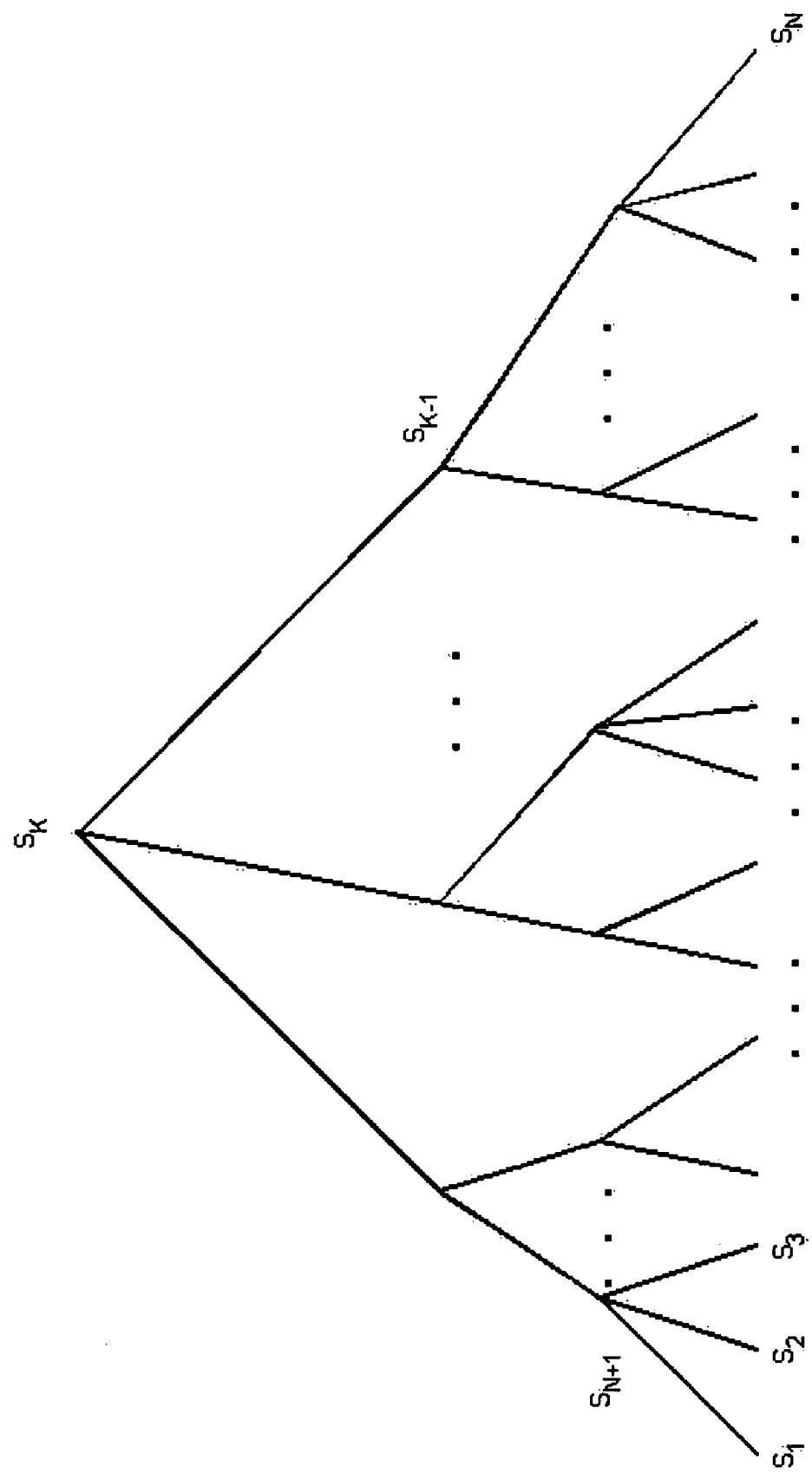
FIG. 5a illustrates a tree structure embodiment wherein each of the signals associated with any one bottom node is orthogonal to all other signals associated with all other bottom nodes, and any single signal associated with a single node on the next level is orthogonal to all other signals associated with all other nodes at that same level but have correlation to signals associated with any nodes it is connected to at the lower or upper level, including upper or lower levels that require traversing through any number of upper or lower level nodes to reach.

An example tree structure is shown in FIG. 5a. The connections describe the correlation properties of the nodes involved in the system. A node is correlated with another node if there is a path to a higher node (ancestor) or lower node (descendent). Nodes at the same level are designed to be orthogonal, or nearly so. The tree shows the correlation structure needed among signature vectors within a signature vector set to allow for the low complexity tree-MUD to result in high quality demodulated symbol streams for all the interfering users.

The advantage of having the tree structure is that the maximum likelihood MUD can be constructed in a recursive manner. This is because the decisions about each users' symbols are only functions of the ancestors and decedents of that node on the tree. A multicarrier system can be designed to support the tree structure in an overloaded communication environment, and a general multicarrier-multiuser communication system is described herein and adapted to this framework.

The geometric structure imposed on a signal vector set is best described by saying that the set of signatures has tree-structured cross-correlations. Specifically, S will have the desired structure if the signal vectors can be assigned to the nodes of a tree. The tree pictorially conveys the following required relationships among user signal vectors: each vector at a given level of the tree is orthogonal to all other vectors at that level; and a signal vector is correlated only with its ancestor vectors (parent, grandparent, etc.) and its descendent vectors (children, grandchildren, etc.). Both linearly dependent and linearly independent sets of signature vectors may be created to have tree-structured cross-correlations.

In one embodiment, the MUD module 420 is adapted to find the optimal solution for both cases. The constraint of tree-structured cross-correlations, while very particular, actually allows a considerable amount of flexibility in designing user waveforms. Given a tree, a signal set can be constructed that possesses the desired cross-correlation structure. Assume, for example, that waveforms at the bottom level of the tree comprise an orthogonal set. An orthogonal set can be obtained at any level (i.e., the $1^{th}$ level) by constructing a signal at each node at this level as a linear combination of the signals at its bottom-most descendent nodes. Since a tree with orthogonal signals is assigned to the lowest level nodes, the sets of descendents for distinct nodes at the $1^{th}$ level are disjoint, and consequently the signals created at level 1 are mutually orthogonal.

It follows that one general construction of a signal set with tree-structured cross-correlations requires: (a) the specification of the tree structure (e.g., including the number of levels, L, and the parent-child relations for all levels of the tree); (b) the specification of any orthogonal basis $s_1, s_2, \ldots s_N$, of $\mathrm{IR}^N$, which is then assigned to the N nodes on the finest scale of the tree; (c) the specification of the weights for each of the linear combinations used to construct signals from their bottom-level descendents; and possibly (d) the deletion of signals at any of the nodes. This formulation allows for considerable flexibility in designing the signal set since any choices that satisfy (a) through (d) will lead to the desired geometric structure on the signal set. Note also that (d) provides the flexibility to capture linearly independent sets with the desired correlation.

As detailed herein, another more general approach to creating a set of tree-structured signatures allows for unknown transmitter or channel distortions and asynchronous reception of signals.

Tree Joint Detection Algorithm

The optimum joint detector, which is known in the art, for the problem stated in Equation 1 chooses the weight vector estimate, $\hat{b}$, according to the nearest neighbor or minimum distance rule.

$$\hat{b} = \arg\min_{b \in P^K} \|r - Sb\|^2. \qquad \text{(Equation 2)}$$

For ease of discussion, assume each user employs the same M-ary PAM, where $b_i \in P, \forall i$. Note, however, that this assumption is not essential to the operation of the tree algorithm or to all embodiments of the invention. A multiple access system employing an arbitrary set of signal vectors, S, can achieve the optimal detection of the above detector through an exhaustive search. In one particular embodiment, the detector performs $M^K - 1$ comparisons to find the best estimate.

If the signal set has been constructed to have the tree cross-correlation structure previously described, the optimum detector of Equation 2 can be achieved through a tree-structured algorithm that offers a huge reduction in the number of comparisons, as detailed in Learned's thesis. In particular, because of this tree structure, a signature at a given node is correlated with all signatures at its ancestor and descendent nodes and is orthogonal to all other signatures on the tree. As such, the weight estimate, $\hat{b}_n$, at a given node, n, will effect the estimates at descendent and ancestor nodes but will not effect the other estimates on the tree.

Figure 5B:
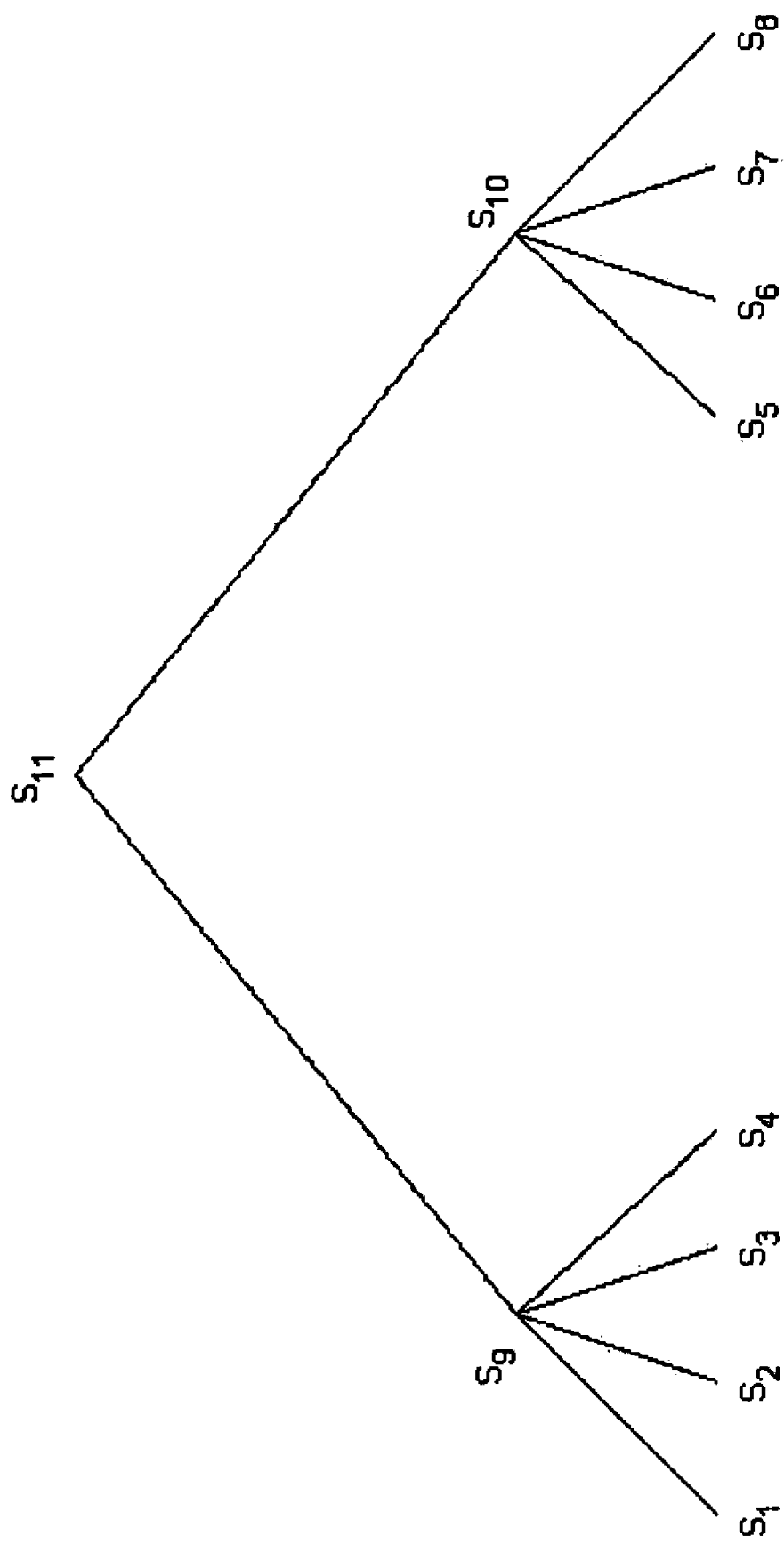
FIG. 5b illustrates an example correlation tree for any generic set of 11 user signatures.

Consider, for example, the example tree structure in FIG. 5b. Note the choice of the weight estimates for users 1 through 4 having signal vectors $s_1$, $s_2$, $s_3$, and $s_4$. These vectors are mutually orthogonal, and are also orthogonal to $s_5$, $s_6$, $s_7$, and $s_8$, and $s_{10}$ but not to $s_9$ and $s_{11}$. Since $s_5$ through $s_8$ and $s_{10}$ are also correlated with $s_{11}$, the decisions on weight estimates for these users are not decoupled from those for $s_1$ through $s_4$. However, the decisions on weight estimates for these users can be decoupled by looking, instead, at the conditional estimates.

More specifically, for each possible pair of weight estimates for $s_9$ and $s_{11}$, the optimal weight estimates can be computed for $s_1$ through $S_4$ independently (i.e., the problem to be solved for each of these weight estimates is decoupled not only from the other three but also from the weight estimates corresponding to $s_5$ through $s_8$ and $s_{10}$). The result of this calculation for $s_1$ through $s_4$ can be thought of as producing a conditional weight estimate table (i.e., for each possible pair of choices for the weight estimates for $s_9$ and $s_{11}$, the optimal weight estimates are known for $s_1$ through $s_4$). Similarly, for each pair of possible weight estimates for $s_{10}$ and $s_{11}$, the optimal estimates for $s_5$ through $s_8$ can be computed.

If $s_9$ is now considered, this process can be iterated: for each possible choice of weight value for its ancestor $s_{11}$ and with knowledge of the just-constructed conditional estimate table for its descendents $s_1$ through $s_4$, the optimal estimate can be computed for $s_9$ in a manner decoupled from the analogous computation for $s_{10}$. This gives conditional estimate tables for $s_9$ and $s_{10}$ that can be used to determine the optimal estimate for $s_{11}$ at the top of the tree. Conceptually, once this estimate is determined, it is a simple matter of successive table look-ups, with propagation down the tree continuing to determine the optimal estimates first for $s_9$ and $s_{10}$ and then for their descendents.

As this example illustrates, the tree detection algorithm takes advantage of the tree structure and sweeps through the tree from bottom to top, creating a conditional weight estimate table at each node. The table of decisions at a given node is conditioned on weight decisions of the ancestors and is a function of weight decisions of the descendents. Since each conditional estimate table requires entries for each possible combination of weights at all ancestor nodes, the number of computations needed to create a table and the size of the table is exponential in the number of ancestors (since if there are l ancestors there are $M^l$ possible sets of weight values for these ancestors). This complexity decreases exponentially as l decreases (i.e., as the algorithm moves from the bottom to the top of the tree, the number of decisions made at each level decreases exponentially until there is only one decision associated with the top node of the tree). The full weight vector estimate for all user weights is a by-product of the last decision at the top of the tree.

While the complexity of the procedure is exponential in the number of levels in the tree (which bounds the number of ancestors of each node), note that the actual algorithm complexity is extremely modest. If the tree were of uniform construction (i.e., if there are Q children emanating from each node, the number of levels of the tree is logarithmic in the number of users, K. Hence, the overall complexity is, then, bounded by a very low-order polynomial in K.

Overloaded MC-CDMA via Tree-Structured Signature Sets

Referring to FIGS. 6a-6d, the depicted system shows 16 subcarriers and various use of those 16 subcarriers assigned to 16 orthogonal users in an MC-CDMA system. Each subplot shows four users occupying a total of 16 subcarriers, and each user's carriers are designated as follows:

——b Users ; ----r Users; - - - -k Users; ········g Users

Figure 10:
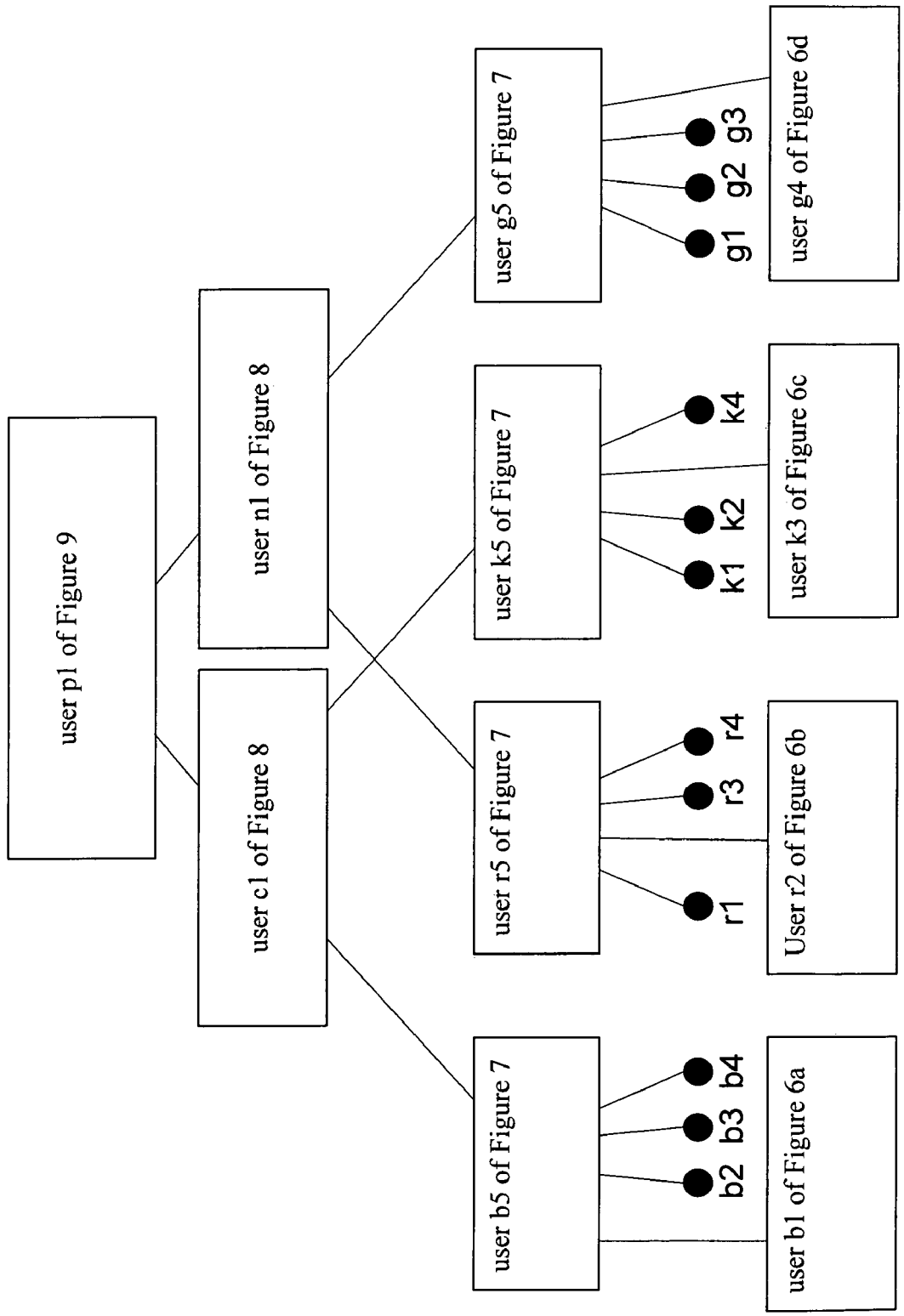
FIG. 10 is a detailed tree structure for the MC-CDMA example, configured in accordance with one embodiment of the invention.

This figure is labeled with the same coding used in the tree structure shown in FIG. 10, and will be built upon to create a tree of interfering signature signals for use in an overloaded tree-structured MC-CDMA. Four user signals are shown in each plot as is indicated by the use of different types of lines. For example, in FIG. 6a, there is a single user that transmits its symbol on four carriers with the four frequency pulse carrier signals as shown, each one shown as a "positive-pulse" in frequency. In FIGS. 6a-d, one user from each group is shown per plot, where there are four users from the dotted-line group, one in each of the FIGS. 6a, b, c, and d; there are also four from the dashed line group, one in each figure, etc.

The first subplot, FIG. 6a, shows nodes b1, r1, k1, and g1. The next subplot, FIG. 6b, shows users b2, r2, k2, and g2 and so forth. For the four users in group b, each user is assigned a 4-subcarrier signature signal using the same four subcarriers, where each user's signal in group b is orthogonal to the other three users' signals in group b because of their spreading codes. Moreover, the group b users' signature signals are orthogonal to all other users' signature signals (all other groups) because group b users employ a different set of subcarriers than any of the other groups (r, k, and g). In this example, the users in group b can be assigned Hadamard codes to make them separable. The use of the Hadamard code is for illustrative purposes only and not to be deemed as limiting. An identical explanation as that above for group b users is true for each of the other groups, r, k, and g.

Referring again to FIGS. 6a-6d, the 16 signals form the base nodes of the tree structure in a tree-packed MC-CDMA system. These 16 signature signals could, coincidentally, be used in a fully loaded state of the art MC-CDMA system. Each figure shows a single user's carrier set for each of the four groups. Specifically, the top plot, FIG. 6a, shows users b1, r1, k1, and g1, where each of these four users employs a signature signal that is comprised of four subcarriers. The second plot, FIG. 6b, shows users b2, r2, k2, and g2, each using the same four subcarriers as its corresponding group user's signature signal from FIG. 6a. Note that the user signatures of the same group defined in the plots are orthogonal due to a careful weighting of the subcarrier pulses (this is code orthogonality). Users corresponding to different groups in each plot are orthogonal due to the fact that their signature signals comprise disjoint sets of subcarriers.

Figure 7:
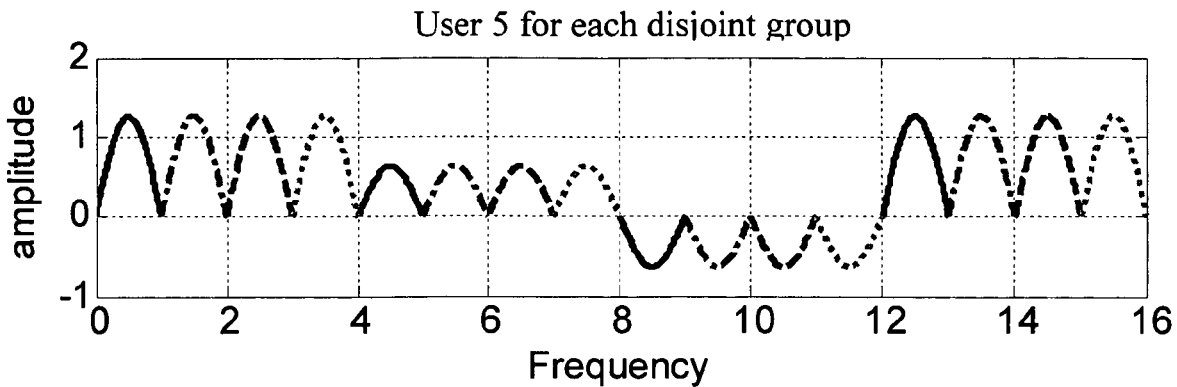
FIG. 7 shows a 5th user added to each group to make the system overloaded, wherein this figure shows four signature signals, one for each group, and wherein these four signature signals are orthogonal to one another because they use disjoint sets of subcarriers.

The complete set of interfering overloaded user signature signals are then created from these 16 orthogonal users. See FIG. 10 for an example of a complete tree, where these 16 signature signals would correspond to the bottom 16 nodes of this tree. Beginning with the 16 signatures that comprise a fully loaded MC-CDMA system as shown in FIG. 6, we might add a $5^{th}$ user to each subcarrier grouping. As shown herein, the user's signature signals will correspond to a node in the tree directly above the base node groups. The $5^{th}$ user, as illustrated by this example, would use any combination of the subcarriers used by the users of the same group. For example FIG. 7 shows a viable subcarrier assignment for each of 4 new users (one in each group), b5, r5, k5, and g5. Each new user is correlated with all base node users of the same group and is orthogonal to all signature signals corresponding to the base nodes of other groups.

Referring to FIG. 7, a 5th user is added to each group to make the system overloaded. This figure shows four signature signals, one for each group. These four signature signals are orthogonal to one another because they use disjoint sets of subcarriers. Each signal, however, is correlated with the signals of the corresponding group in the base set of signals shown in FIG. 6.

Combining FIGS. 6a-6d and FIG. 7 into FIG. 10 offers an illustration of the remainder of the tree building process, and, in this example, is formed from combinations of the subcarriers associated with the base nodes in that group. An example realization of the signature signals that correspond to the next level up in the tree is show in FIG. 8 where signature signals for users c1 and n1 are created. The signature signal for user c1 is correlated with all signatures that lie in a direct path beneath it on the tree, and it is orthogonal to all other signature signals corresponding to the other nodes in the tree.

Figure 8:
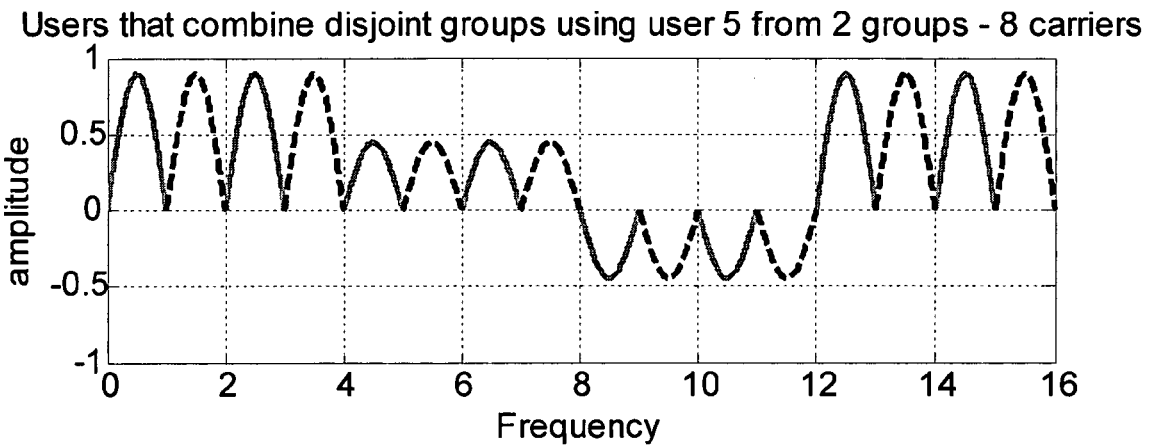
FIG. 8 shows 2 user signature signals, corresponding to users c1 and n1 in the tree, wherein each user's signature signal is built from 8 subcarriers each and the link between these signature signals and their correlated sets upon which they were built is detailed herein.

Referring to FIG. 8, this figure shows two user signature signals, one per group, corresponding to users c1 and n1 in the tree. Each user signature signal is built from 8 subcarriers each. As detailed herein, there is a link between these signature signals and their correlated sets upon which they were built. Note that to maintain tree structure, in this example, the 4 orthogonal subcarrier sets used in the definition of the 4 user groups in FIGS. 6a-6d have been split into 2 disjoint sets of 8 subcarriers each, or 2 sets comprised of two groups each, assigning a single group to no more than one set.

Figure 9:
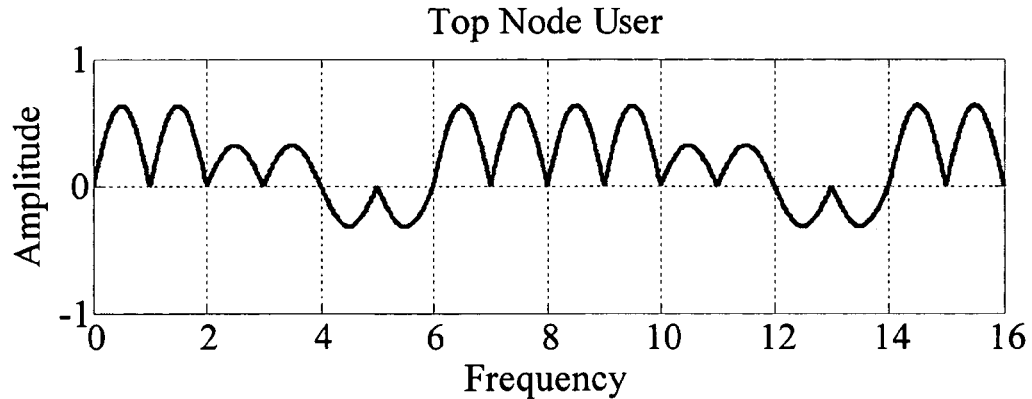
FIG. 9 shows the top node in the MC-CDMA example wherein the user is correlated with all other users in the system, and uses all the subcarriers.

The tree is completed with the top node user, p1, having the signature signal shown in FIG. 9. The signature signal for user p1 is correlated with all other user signatures corresponding to all other nodes in the tree.

Referring to FIG. 9 and FIG. 10, the top node in the MC-CDMA example is illustrated. This user is correlated with all other users in the system and uses all the subcarriers. Some nodes are replaced by their spectral realizations to further detail the assignment of subcarriers to nodes. It should be understood that the first four base nodes on the lowest level use the same subcarriers, followed by the next four using a different subcarrier set in frequency, and so forth.

Notice that the tree structure used in this MC-CDMA example would be corrupted in an uplink scenario because each user's signal goes through a different channel. For example, if two b users go through different channels then their received spectrums are no longer orthogonal because the codes have been changed by the channel. However, the b users will still be orthogonal to the r users because they use different carriers. To overcome the loss of orthogonality caused by the channel the signals can be precoded to account for the channel so they arrive at the receiver orthogonally. If precoding is not feasible then the tree as shown in FIG. 10 is not the right tree for use by the tree-structured MUD and must be adapted to account for the correlation between these base nodes. Specifically for the channel corruption case just mentioned, the 5 b-users would appear in a straight line path beneath user c1 and the 5 k-users would also appear in a straight line path beneath user c1. The same would be true for the r-users and g-users. The result would still be a tree, but with 7 levels instead of 4, upon which the tree-MUD would still operate efficiently and optimally. The computational complexity, however, would be larger than for the case of the tree shown in the figure (the tree with 4 levels.)

Overloaded OFDMA Via Tree-Structured Signature Sets

Another possible realization of the tree structured signal packing to multicarrier communications is to use OFDMA on an uplink scenario. In this case the base nodes of the tree are formed from each subcarrier. So the base nodes do not necessarily correspond to a user's signal, but, more generally, to a subcarrier in the bandwidth. This means that a single user could correspond to a single node at the base of tree (if this user requires only a single subcarrier, possibly due to having a reliable single carrier channel) or to multiple nodes at the base of the tree (the usual OFDMA realization to overcome independent fading among the subcarrier channels.) The reason for structuring the tree this way is that each information symbol to be detected in the MUD is treated as a "virtual user".

Figure 11:
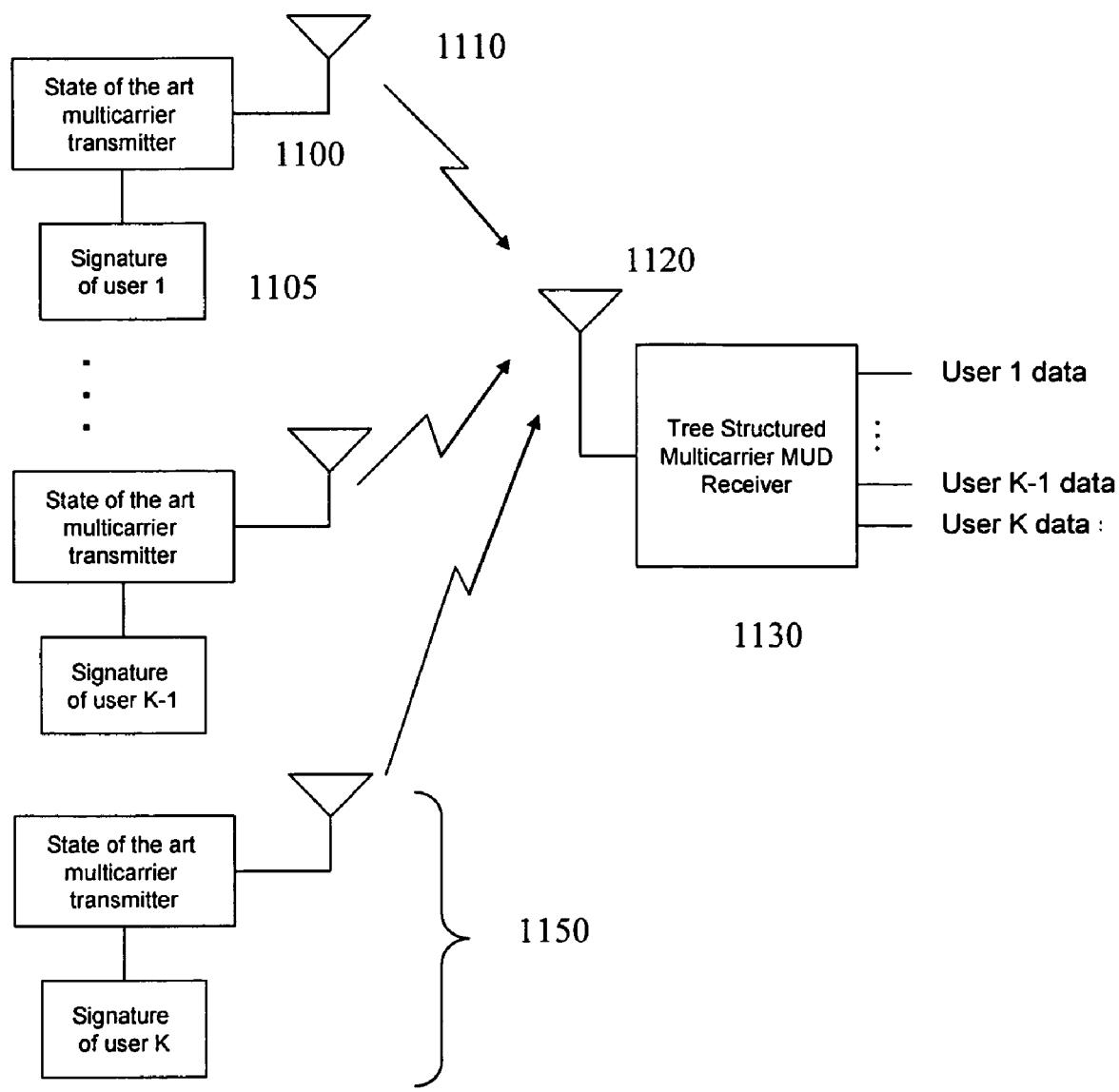
FIG. 11 Block diagram of a wireless multicarrier system with a tree structured multiuser detector, wherein each user could be an OFDMA transmitter communicating with a base station in a cellular system, configured in accordance with one embodiment of the invention.

Referring to FIG. 11, a block diagram of a wireless multi-carrier system with a tree structured MUD is shown. In this particular embodiment, there is a multicarrier transmitter 1100 coupled to a signature module 1105 for User 1. The transmitted signal is transmitted from some form of transmitter antenna 1110. There is typically a plurality of such transmitter sections 1150 for each of the K users. The transmitted multicarrier signals are received by a multicarrier MUD receiver antenna 1120 for subsequent processing in the MUD receiver 1130. Each user, for example, could be an OFDMA transmitter communicating with a base station in a cellular system.

As long as the number of independent streams coming from all the users is not greater than the number of subcarriers the system is not overloaded, and it will have a traditional OFDMA system. If the system is overloaded, the processing can be accomplished in a tree structured way as detailed herein. Overloading an OFDMA system to adhere to the tree-structure recommendation may be done is several ways. One example is offered herein, however the present invention is not limited to a particular implementation.

Figure 12:
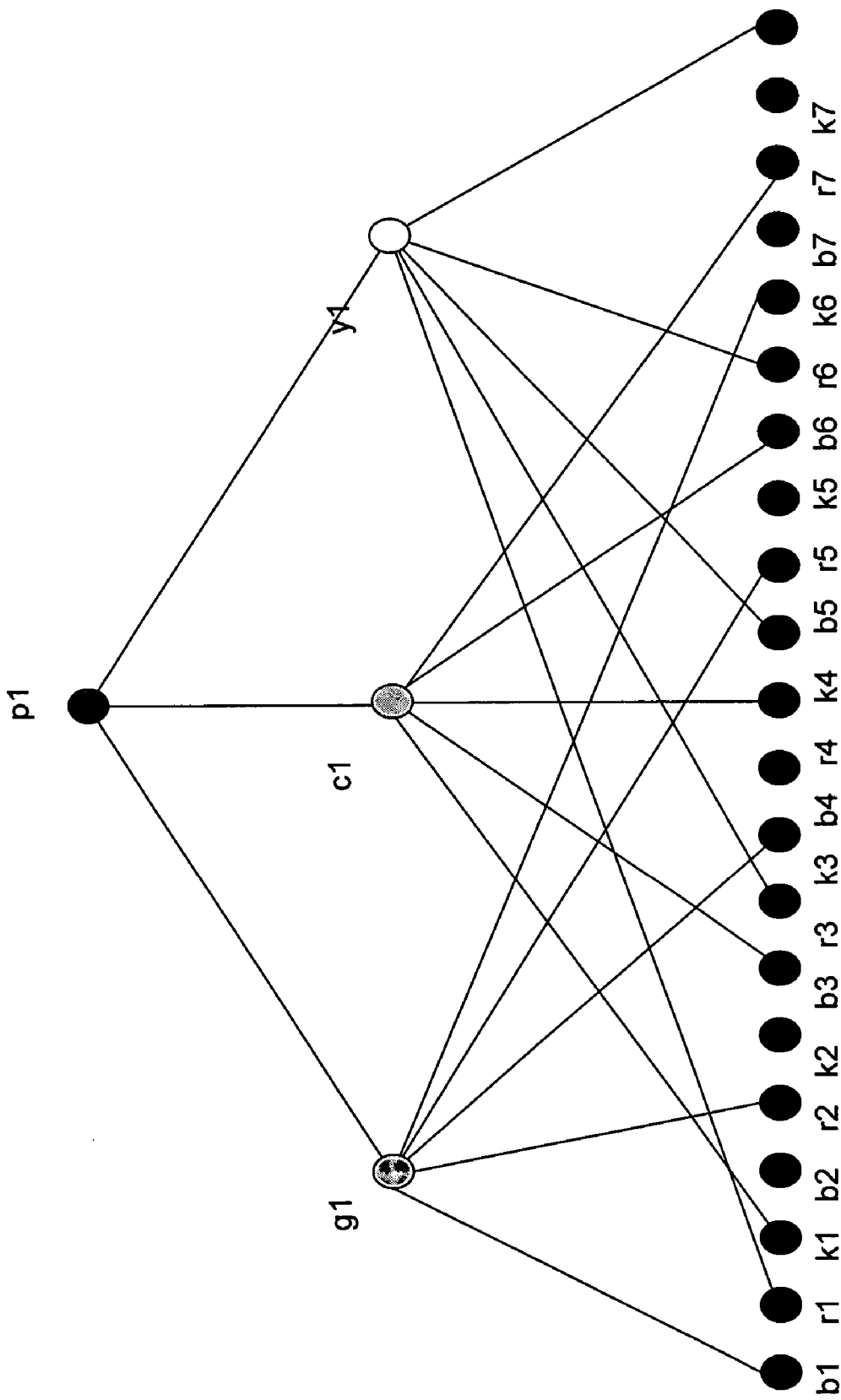
FIG. 12 is a perspective view of an overloaded OFDMA example tree structure, configured in accordance with one embodiment of the invention.

As an illustrative example to creating the tree-structured signature set for overloaded OFDMA operation see FIG. 12. The bottom nodes, for this example, represent individual subcarriers. A bottom node user might transmit it's symbol on more than one subcarrier, as indicated here with the letter portion of the node labels, so that the "b" user has been assigned the "b" subcarrier set, the nodes marked b1, b2, b3, . . . b7. To preserve tree structure so that we obtain the benefit of the low complexity tree-MUD, an information symbol from any single bottom-node user is "connected" to any other information symbol from that same user based on the way that user has precoded its information symbols over the subcarriers assigned to that user. An attractive benefit to using this method of ignoring the "connections" among the subcarriers assigned to a single user, is that the tree structure is maintained even if the channels of individual users widely vary. All of the higher level users send the same symbols over the set of multiple subcarriers as denoted by the parent-child connections in the tree.

A Detailed Example Tree Structure for an OFDMA System.

One embodiment of an overloaded OFDMA example tree structure is shown in FIG. 12. Nodes are named in accordance with the transmitter they come from (i.e. the node b5 is the $5^{th}$ carrier transmitted by user b). There are a total of 7 users (b, r, k, g, c, y, and p) and 21 subcarriers (the number of base nodes).

The base nodes are conventional OFDMA transmitters that send information over several subcarriers. For this example, there are three users, b, r, and k. This set of three users comprise a typical OFDMA system where each user has been assigned its own set of subcarriers that is disjoint to all other subcarriers in use by the other users. The higher level users have each been assigned a single signature signal comprised of a carrier subset, being a subset of the base subcarriers to which they are "connected" on the tree. Each signature signal corresponding to the second level of the tree is based upon a carrier subset that is disjoint with the carrier subsets used for the signature signals corresponding to the other users at this same level of the tree. Each user at the second level of the tree uses its entire set of subcarriers to send a single symbol, specifically, a user at this level will send a symbol over combinations of its carriers. In this example, the y1 user will either repeat, use a direct sequence code over, or precode its information over several subcarriers, where, as shown in the figure, it uses two of the r user's subcarriers (r1, r3), two of the k user's subcarriers (k4, k7), and one of the b user's subcarriers (b6).

This particular approach to overloaded tree-structured OFDMA is nice because it can be adopted for multiple quality of service assignments. For instance, the base node users may have better signal quality at the receiver so they can use separate information symbols on each carrier whereas, the higher level users may have lower signal quality and require lower quality of service so preceding a symbol over multiple carriers could be useful for gaining diversity and maintaining the users link at a lower data rate.

Note that in all cases above, the channel can be accounted for and the tree structure is maintained at the receiver even though each signal will go through a different channel. Note that even if strict tree structure is not maintained, the tree-MUD can still be used as a low complexity suboptimal MUD instead of a low complexity optimal MUD. More specifically, if the cross correlations across a level of the tree are small relative to those for received signals corresponding to a lineage-path in the tree, then the tree-MUD can still be implemented with only a negligible loss as compared to the case where strict tree structure was maintained.

Methodology

Figure 13:
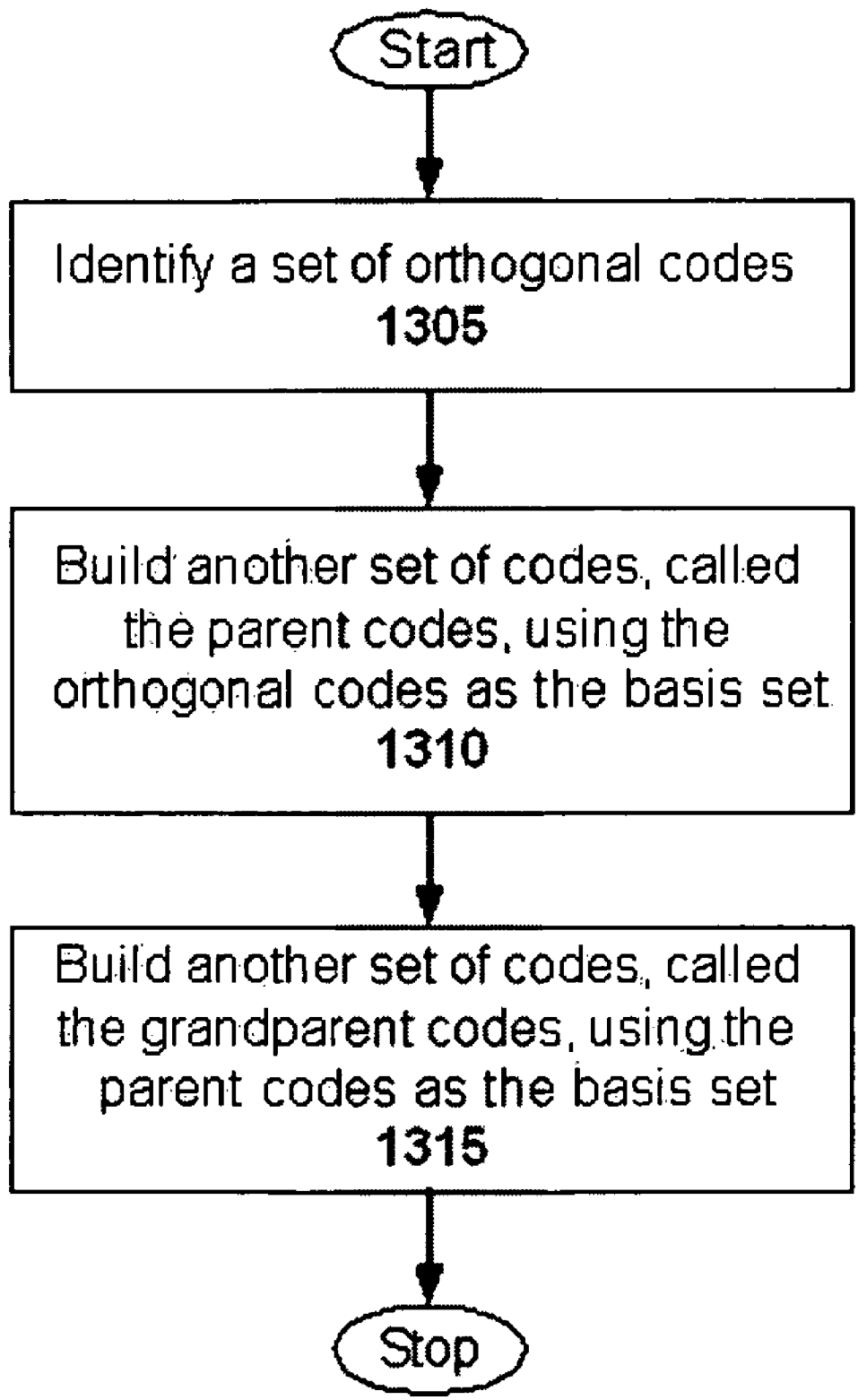
FIG. 13 illustrates a method for creating tree-structured MC-CDMA signature signals to allow for overpacked MC-CDMA communication in accordance with one embodiment of the present invention.

FIG. 13 illustrates a method for building a set of spreading codes for tree-structured MC-CDMA communication in accordance with one embodiment of the present invention. The method can be carried out, for example, by a communications system configured with tree-structured MC-CDMA transceivers configured as described in reference to FIG. 13. In one specific embodiment, the method is carried out by the MC-CDMA code selector 1310 of FIG. 13. It should be readily apparent that a similar process exists for OFDMA which is further described herein.

The method begins with identifying 1305 a set of "base" spreading codes. This set can be identified, for example, based on a priori knowledge of the communication system, or by listening to the system (e.g., using parameter estimation techniques) and collecting the spreading code information in real-time.

The method proceeds with building 1310 another set of spreading codes, called the parent spreading codes. In one embodiment, this new set of orthogonal codes is built by arbitrarily making "sibling groups" of one or more base spreading codes per group, not allowing any one base spreading code to appear in more than one group, and then linearly combining all the base spreading codes within a sibling group. Notice that in the degenerate case where there is only one code in a sibling group, the base spreading codes are re-assigned, which is an acceptable outcome and often desirable when a near-far scenario naturally exists in the field.

The method proceeds with building 1315 another set of spreading codes, called the grandparent spreading codes. This set of codes can be built, for example, in the same manner as the parent spreading codes are built, but with the parent spreading codes acting as the basis set. Thus, the set of grandparent spreading codes is built by arbitrarily making sibling groups of one or more spreading parent codes per group, not allowing any one parent spreading code to appear in more than one group, and then linearly combining all the parent spreading codes within a parent sibling group.

FIG. 13 shows the process if the linear combination rule is to be used to create signature signals from other signature signals. A similar process may be used, but, more generally, at each step, the new signature signal is created from the set of all subcarriers used by the group of signature signals connected to as children or the group of subcarriers used by any of the descendants, including the corresponding bottom nodes to the current node under construction. This more general process is specific to the example shown in FIG. 10. There could, in a more general case, be hundreds of bottom nodes, and possibly hundreds of base MC-CDMA users at the bottom of a tree, leading to many more levels than shown in this example, however, the process would simply continue in the same manner as put forth here, and would end when there are no more nodes to combine. The process, in a more general form, also includes a step of deleting any nodes on the tree after the creation of the full tree.

For an adhoc implementation, each user can be pre-assigned a dictionary of possible spreading codes from which to choose, so that a given percentage of code corresponds to each level of the family tree. For instance, a radio could be assigned ten different codes from a three layer tree: five codes from the sibling level, three codes from the parent level, and two codes from the grandparent level. Further, note that radios can cycle through their code dictionary according to a metric, such as a metric based upon a component in a global positioning satellite (GPS) signal or by a "reprogram" signal.

In addition, each radio and/or message can be assigned a priority value that can be used to help keep the MC-CDMA communication system from failing in times of extreme demand or in times of reduced channel resources. In operation, a radio that wishes to transmit will perform the parameter estimation to determine the loading of the system and the codes currently in use. The radio will decide if it can begin to transmit (or continue to transmit). In one such embodiment, the radio will only transmit if a look-up or metric calculated from the current system loading and the priority value of the radio or message allows for an "ok" to transmit.

In one embodiment, a radio will choose which of it's spreading codes to use for transmission by, for example, first determining the received powers and rates of each active user (which is low complexity because of the tree-structure), and then determining the approximate distance along with a rough channel degradation value for its own communication link with its own destination receiver with the list of users, each of their codes, powers and rates. A low complexity ad-hoc near-optimization can then be computed to determine the first code to try (should often be the final code that will work for the duration of the link).

Note that a spreading code already in use may be employed. This would happen if the currently active user, transmitter A, has an estimated received power at receiver B that is in excess of the data rate of this user. This means that receiver B can receive both the signal from transmitter A and the signal from transmitter B perfectly, even if transmitter A is behaving like the traditional spoofer to the transmitter/receiver B. Receiver A that is the intended destination for the signal from transmitter A will either be able to receive the signal from transmitter A without degradation, most of the time not even having to account for the presence of the signal from transmitter B.

The receiver will pay attention to a sub-set of bit streams included in all the bit streams provided by the MUD module. In particular, the receiver will pay attention to a sub-set of bit streams that correspond to the dictionary of codes that it knows the radio to use. From those codes, the receiver will know which is the right one when it finds a target stream in a header or the like. Alternatively, the code dictionary can be eliminated by configuring or otherwise forcing each receiver to look at a header or other such portion of each signal's data until the receiver finds the one it is looking for. Either way, the best bit error rate (BER) will be achieved when all signals are jointly decoded so this information is available.

Note that if the receiver of the radio determines the link to be poor or the packet to be in error, that radio can transmit back to the transmitter and advise the transmitter to either choose another code (e.g., which can be a short message) or use a code that the receiver has chosen (e.g., from performing an optimization algorithm using a look-up table).

In the case where no feedback from receiver to transmitter is available, there are alternative ways for communicating through possible bad links. For example, one way for communicating through a possible bad link is to change the code used at predetermined intervals. Note that using predetermined intervals will make the receiver's job easier. Another way for communicating through a possible bad link is to change the code at randomly determined intervals. Here, since the receiver is always tracking the number of active signals and all their parameters, it will follow the intended transmitter's switch, but will have to re-examine headers to regain lock on the transmitter of interest. In addition, special care must be taken to maintain the tree structure when assigning a new code.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A tree-structured multicarrier interference multiple access (MC-IMA) transceiver for use in a multiple access environment having a number of interfering signals, comprising:
   an environment estimator module configured to estimate and track the number of interfering signals of the environment;
   a multicarrier signature signal selector configured to determine a multicarrier signature signal as a function of the environment, and to identify an actual multicarrier signature signal that is closest to the multicarrier signature signal wherein tree-structured signatures are created without exact mathematical combinations;
   a signal transmitter configured to transmit a multicarrier multiple-access signal in accordance with the actual multicarrier signature signal identified by the multicarrier signature signal selector; and
   a multiuser detector (MUD) module configured to perform tree structured multiuser detection signal processing, and to produce a bit stream for each interfering received signal;
   wherein the multicarrier signature signal selector is further configured to build a set of parent multicarrier signature signals based on a known set of basis subcarriers used in the base set of multicarrier signature signals, and to build a set of grandparent multicarrier signature signals based on either the set of parent multicarrier signature signals or the basis set of subcarriers from which those signals were comprised, and to continue creating ancestor nodes in the same manner until there are no more nodes to combine in this manner, and wherein a code selector is further configured to arbitrarily making sibling groups of one or more base multicarrier signature signals per group, not allowing any one base multicarrier signature signal to have a non-zero or non-negligible cross correlation with any signal in more than one group, and creating a new multicarrier signature signal by constructing a new multicarrier signature signal from the basis set of subcarriers present in the aggregate of all the signals within a sibling group.

2. The transceiver of claim 1 wherein said multicarrier signature signal selector is configured to determine an optimal multicarrier signature signal.

3. The transceiver of claim 1 wherein said multicarrier signature signal is any multicarrier signature signal that abides by the tree-structure.

4. The transceiver of claim 1 further comprising a stream of interest selector configured to select one or more bit streams of interest.

5. The transceiver of claim 1 wherein the multicarrier signature signal selector is further configured to determine received powers and rates of each active user in the environment, and to determine a channel degradation value for a communication link between the transceiver and a destination receiver.

6. The transceiver of claim 1 further comprising deleting any of the nodes and corresponding signature signals from the set of tree-structured multicarrier signature signals.

7. The transceiver of claim 1 wherein the code selector is further configured to arbitrarily making sibling groups of one or more base multicarrier signature signals per group, not allowing any one base multicarrier signature signal to have a non-zero or non-negligible cross correlation with any signal in more than one group, and creating a new multicarrier signature signal by linearly combining all the base spreading codes within a sibling group.

8. The transceiver of claim 1 wherein the code selector is further configured to arbitrarily making sibling groups of one or more parent multicarrier signature signals per group, not allowing any one multicarrier signature signal to have a non-zero or non-negligible cross correlation with multicarrier signature signals in more than one group, and linearly combining all the multicarrier signature signals.

9. The transceiver of claim 1 wherein the code selector is further configured to arbitrarily making sibling groups of one or more parent multicarrier signature signals per group, not allowing any one multicarrier signature signal to have a non-zero or non-negligible cross correlation with multicarrier signature signals in more than one group, and creating a new multicarrier signature signal from the set of subcarriers used within a sibling group.

10. A method for performing tree-structured multicarrier interference multiple access (MC-IMA) communication in a communications system in a multiple access environment having a number of interfering signals, said communications system comprised of at least one transmitter for transmitting data signals and at least one corresponding receiver, said method comprising the steps of:

estimating and tracking the number of interfering signals of the environment in said communications system;

determining a multicarrier signature signal represented by the environment, and identifying an actual multicarrier signature signal that is closest to the multicarrier signature signal wherein tree-structured signatures are created without exact mathematical combinations;

transmitting a multicarrier multiple access signal in accordance with the actual multicarrier signature signal; and performing tree structured multiuser detection signal processing, and producing a bit stream for each interfering signal;

wherein determining a multicarrier signature signal comprises:

building a set of parent multicarrier signature signals based on a known set of base multicarrier signature signals or the set of subcarriers used by the base set of users; and building a set of grandparent multicarrier signature signals based on the set of parent multicarrier signature signals or the set of subcarriers used by the base set of users; and continuing this progression upward by doing the same for a set of great-grandparent multicarrier signature signals and so on, until all nodes have been linked, and wherein building a set of parent multicarrier signature signals comprises:

arbitrarily making sibling groups of one or more base multicarrier signature signals per group or set of subcarriers used by that group, not allowing any one base multicarrier signature signals to have a non-zero or non-negligible cross correlation with signals in more than one group; and creating a new multicarrier signature signal by constructing a new multicarrier signature signal from the basis set of subcarriers present in the aggregate of all the signals within a sibling group.

11. The method of claim 10 further comprising selecting any multicarrier signature signal that abides by the tree-structure.

12. The method of claim 10 further comprising determining an optimal multicarrier signature signal.

13. The method of claim 12 wherein determining said optimal multicarrier signature signal further includes determining received powers and rates of each active user in the environment, and determining a channel degradation value for a communication link between the transceiver and a destination receiver.

14. The method of claim 10 further comprising selecting a bit stream of interest.

15. The method of claim 10 further comprising deleting any of the nodes and corresponding signature signals from the set of tree-structured multicarrier signature signals.

16. The method of claim 10 wherein building a set of grandparent multicarrier signature signals comprises:

arbitrarily making sibling groups of one or more parent multicarrier signature signals or set of subcarriers used by a group of parents, not allowing any one parent multicarrier signature signals to have a non-zero non-negligible cross correlation with any multicarrier signature signal in more than one group; and creating a new multicarrier signature signal by linearly combining all the base spreading codes within a sibling group or constructing a new multicarrier signature signal from the basis set of subcarriers present in the aggregate of all the signals within a sibling group.

* * * * *

UNITED STATES PATENT AND TRADEMARK OFFICE
CERTIFICATE OF CORRECTION

PATENT NO.       : 7,593,473 B2
APPLICATION NO.  : 11/291883
DATED            : September 22, 2009
INVENTOR(S)      : Rachel E. Learned and Brandon Pierce Hombs It is certified that error appears in the above-identified patent and that said Letters Patent is hereby corrected as shown below:

Column 12

Line 29, delete " $\{\mathbf{S}_k\}_1^K$ ", insert -- $\{\mathbf{s}_k\}_1^K$ --

Column 14
Line 19, delete "$S_4$", insert -- $s_4$ --

Signed and Sealed this
Eighth Day of February, 2011

David J. Kappos
*Director of the United States Patent and Trademark Office*